US012768300B2

(12) United States Patent
Tsotsis

(10) Patent No.: US 12,768,300 B2
(45) Date of Patent: Oct. 20, 2026

(54) CELLULAR CORE FOR AIRCRAFT ACOUSTIC PANEL AND METHOD OF MANUFACTURE

(71) Applicant: The Boeing Company, Arlington, VA (US)

(72) Inventor: Thomas Karl Tsotsis, Santa Ana, CA (US)

(73) Assignee: THE BOEING COMPANY, Arlington, VA (US)

( * ) Notice: Subject to any disclaimer, the term of this patent is extended or adjusted under 35 U.S.C. 154(b) by 445 days.

(21) Appl. No.: 18/301,397

(22) Filed: Apr. 17, 2023

(65) Prior Publication Data

US 2024/0343413 A1 Oct. 17, 2024

(51) Int. Cl.

| | |
|---|---|
| ***F02C 7/045*** | (2006.01) |
| ***B33Y 10/00*** | (2015.01) |
| ***B33Y 80/00*** | (2015.01) |
| ***B64D 33/02*** | (2006.01) |
| ***F02K 1/82*** | (2006.01) |

(52) U.S. Cl.

CPC .............. *F02C 7/045* (2013.01); *B64D 33/02* (2013.01); *F02K 1/827* (2013.01); *B33Y 10/00* (2014.12); *B33Y 80/00* (2014.12); *B64D 2033/0206* (2013.01)

(58) Field of Classification Search

CPC . F02C 7/045; F02C 7/24; F02K 1/827; B64D 2033/0206; B64D 33/02

See application file for complete search history.

(56) References Cited

U.S. PATENT DOCUMENTS

| | | | | |
|---|---|---|---|---|
| 9,978,354 | B2 * | 5/2018 | Nampy | G10K 11/168 |
| 2006/0169532 | A1 * | 8/2006 | Patrick | F04D 29/665 181/210 |
| 2013/0075193 | A1 | 3/2013 | Vavalle | |
| 2017/0122341 | A1 * | 5/2017 | Alonso-Miralles | F04D 29/522 |
| 2019/0063318 | A1 * | 2/2019 | Roach | E04B 1/84 |
| 2019/0160803 | A1 | 5/2019 | Evens et al. | |
| 2020/0063691 | A1 * | 2/2020 | Kruckenberg | B32B 3/12 |
| 2020/0309028 | A1 * | 10/2020 | Murugappan | F02K 1/827 |
| 2020/0347785 | A1 * | 11/2020 | Morin | F02K 1/827 |
| 2022/0389882 | A1 | 12/2022 | Lin et al. | |

FOREIGN PATENT DOCUMENTS

| | | | | |
|---|---|---|---|---|
| GB | 2452476 A | * | 3/2009 | B22F 10/28 |

OTHER PUBLICATIONS

Partial EP Search Report mailed Aug. 19, 2024 in re EP Application No. 24170669.6.

(Continued)

*Primary Examiner* — Jeremy A Luks

(74) *Attorney, Agent, or Firm* — COATS & BENNETT, PLLC

(57) ABSTRACT

Present systems and apparatuses and their methods of manufacture are directed to acoustic core that can be made from metal alloys or thermoplastic materials and formed into single-piece, net-shaped core details possessing one or more of the following features: varying cell size, varying cell-wall thickness, varying cell shape, varying core thickness, incorporation of wall perforations, incorporation of septums, edge closeouts, and non-vertical and/or curved cell walls.

55 Claims, 12 Drawing Sheets

(56) References Cited

OTHER PUBLICATIONS

Seurat Technologies, “How Area Printing Works”, retrieved from the internet: https://www.seurat.com/area-printing [retrieved on Feb. 10, 2023], pp. 1-5.

Hexcel, “Noise-reducing honeycomb for aircraft engines”, retrieved from the internet: https://www.hexcel.com/Products/Honeycomb/HexWeb-Acousti-Cap [retrieved on Feb. 10, 2023], pp. 1-2.

Griese, D. et al., “The Effect of Honeycomb Core Geometry on the Sound Transmission Performance of Sandwich Panels”, 2015-04-01, retrieved from Internet: http://asmedigitalcollection.asme.org/vibrationacoustics/article/137/2/021011/366320/The-Effect-of-Honeycomb-Core-Geometry-on-the-Sound [retrieved on Feb. 10, 2023], pp. 1-37.

Black, S., “Nacelle manufacturers optimize hand layup and consider closed molding methods”, May 1, 2004, retrieved from Internet: https://www.compostiesworld.com/articles/nacelle-manufacturers-optimize-hand-layup-and-consider-closed-molding-methodspp [retrieved on Feb. 10, 2023], pp. 1-8.

Wikipedia, “Acoustic Liner”, Dec. 12, 2022, retrieved from Internet: https://en.wikipedia.org/w/index.php?title=Acoustic_liner&oldid=1121531172 [retrieved on Feb. 10, 2023], pp. 1-2.

Azam, Q. et al., “Numerical Comparison of Drag Coefficient between Nacelle Lip-Skin with and without Bias Acoustic Liner”, International Review of Mechanical Engineering (I.RE.M.E.), vol. 10, No. 6, Sep. 1, 2016, pp. 390-394, Praise Worthy Prize S.r.l.

Nehls, G. “DLR project demonstrates hybrid AM process for composites”, Composites World, Apr. 4, 2023, pp. 1-2, Composites World.

* cited by examiner

CELLULAR CORE FOR AIRCRAFT ACOUSTIC PANEL AND METHOD OF MANUFACTURE

TECHNOLOGICAL FIELD

The present disclosure relates generally to the field of sound attenuation. More specifically the present disclosure relates to the field of acoustic panels for aircraft assemblies to attenuate sound.

BACKGROUND

Aircraft-engine assemblies produce high noise levels due to the high airflows through inlets, rotating stages and exhaust nozzles, etc. To reduce such noise levels and comply with noise regulations governing commercial aircraft, high-bypass-type aircraft-engine assemblies incorporate acoustic panels in various locations of the engine, such as in the inlets of engine nacelles, thrust reversers, etc. These acoustic panels, sometimes referred to as acoustic treatments may comprise a septum-containing cellular, or "honeycomb" core that is oriented, or "sandwiched" between a perforated inner skin or facesheet and a non-perforated outer skin or facesheet. The skins or facesheets may comprise a metal such as aluminum or titanium alloys, or a composite material, and the honeycomb core may comprise a metal, a ceramic, or a composite material.

Acoustic sandwich panels include a core sandwiched between two liner sheets. One of the liner sheets is typically perforated while the other sheet is not typically perforated. The core provides bulk (e.g. separates the inner and outer facesheets) and defines a plurality of cavities. Apertures defined by the perforated liner sheet fluidly couple the cavities' ambient environment. Therefore, when air flows across the perforated liner sheet of an acoustic sandwich panel, the cavities in the core can act as Helmholz resonators and attenuate the sound of the associated airflow. In addition, adjacent cavities in the core can comprise acoustic septa to attenuate the sound of the airflow.

Further aircraft assemblies, including aircraft assemblies incorporated within aircraft fuselages, aircraft assemblies in communication with an airflow, etc., can also comprise acoustic, sound-reducing panels (referred to equivalently herein as "sound-attenuating panels" and "sound-altering panels") for purposes that can include the reduction or redirection of noise in the form of attenuated and/or redirected sound that be caused by and otherwise emanate from sound-generating assemblies (e.g., aircraft engines, aircraft assemblies in communication with an airflow passing through, or in otherwise contact with, an aircraft assembly, etc.).

Such sound attenuation for sound-producing aircraft assemblies can be required for aircraft compliance with Federal Regulations, local-municipality sound ordinances as well as for passenger comfort, etc.

Unless explicitly identified as such, no statement herein is admitted as prior art merely by its inclusion in the Technological Field and/or Background section.

SUMMARY

Present methods, systems, and apparatuses disclose rapidly fabricated and highly tailored acoustic core and other integrated components for sandwich structures for applications such as aircraft propulsion systems. Acoustic core can be made from metal alloys or thermoplastic materials. Single-piece, net-shaped core details possessing one or more of the following features may be produced: varying cell size, varying cell-wall thickness, varying cell shape, varying core thickness, incorporation of wall perforations, incorporation of septums, edge closeouts, and non-vertical and/or curved cell walls. Other variations that are not listed above can also be included in an overall core design to optimize weight, acoustic performance, and producibility. If desired, facesheets may also be incorporated directly and integrally into a core structure to remove need for secondary attachment.

According to a present aspect, an apparatus is disclosed including a seamless, one-piece acoustic panel that includes a seamless, integral first facesheet and a seamless, integral second facesheet, with at least one of the seamless, integral first facesheet and the seamless, integral second facesheet including a plurality of perforations extending through at least one of said seamless, integral first facesheet and the seamless integral second facesheet. The plurality of perforations can be a selected pattern of a plurality of perforations The seamless one-piece acoustic panel further includes a seamless, integral cellular-core section that is seamlessly interposed between the seamless, integral first facesheet and the seamless, integral second facesheet, with the seamless, integral cellular-core section including a plurality of seamless cells, with the plurality of seamless cells each comprising a plurality of seamless-cell walls, and with the plurality of seamless cell-walls defining a seamless-cell chamber in each of said plurality of seamless cells.

In another aspect, the seamless, one-piece acoustic panel includes localized areas of higher-density material to accommodate loads associated with attachment hardware and/or aerodynamic loads due to the deployment of a thrust reverser.

In another aspect, the seamless cell chamber includes a selected seamless cell-chamber volume.

In another aspect, a first seamless cell includes a first selected seamless cell-chamber volume, a second seamless cell comprises a second selected seamless cell-chamber volume, and the said first selected seamless cell-chamber volume differs from the second selected cell-chamber volume of an adjacently positioned seamless cell chamber of at least one the plurality of seamless cells.

In a further aspect, at least one of the plurality of seamless cells includes a seamless septum, with the seamless septum positioned within the at least one of the plurality of seamless cells, with the seamless septum positioned at a first selected depth ("d1") within the seamless cell-chamber of at least one of said plurality of seamless cells, and with the seamless septum integrally formed with the plurality of seamless-cell walls.

In another aspect, the first seamless cell includes a seamless septum positioned at a first selected depth ("d1") within a first seamless-cell chamber, with the second seamless cell comprising a seamless septum positioned at a second selected depth ("d2") within a second seamless-cell chamber, wherein the first selected depth differs from the second selected depth, and with the seamless septum integrally formed with the plurality of seamless-cell walls.

In another aspect, the seamless septum further comprises a plurality of perforations extending through the seamless septum.

In another aspect, the seamless septum further comprises a plurality of patterns of perforations extending through the seamless septum.

In another aspect, at least one of the plurality of seamless-cell walls is configured to be non-perpendicular to at least one of the seamless, integral first facesheet and the seamless, integral second facesheet along the length of the at least one of the plurality of seamless cell walls and said cell chamber.

In another aspect, at least one seamless-cell chamber comprises a selected non-uniform thickness along its length.

In another aspect, at least one of the plurality of seamless-cell walls has a selected seamless cell-wall thickness that is non-uniform along its length.

In a further aspect, at least one of the seamless, integral first facesheet and the seamless, integral second facesheet includes a selected non-uniform thickness along its area.

In another aspect, at least one of the seamless, integral first facesheet and the seamless, integral second facesheet comprises a non-uniform density along its area.

In a further aspect, the seamless, integral first facesheet has a seamless, integral first-facesheet thickness that is different from the seamless, integral second-facesheet thickness.

In a further aspect, the seamless integral first facesheet has a seamless integral first-facesheet thickness that is substantially equivalent to the seamless integral second face sheet thickness.

In another aspect, the seamless integral first facesheet has a seamless, integral first-facesheet density that is different from the seamless, integral second-facesheet density.

In another aspect, the seamless, integral first facesheet has a seamless, integral first-facesheet density that is substantially equivalent to the seamless, integral second-facesheet density.

A further present aspect is directed to an object that includes a seamless one-piece acoustic panel that includes a seamless, integral first facesheet, a seamless, integral second facesheet, with at least one of the seamless, integral first facesheet and the seamless, integral second facesheet including a plurality of perforations, that can be a selected pattern of a plurality of perforations, with the pattern of perforations extending through at least one of said seamless, integral first facesheet and the seamless, integral second facesheet. The seamless one-piece acoustic panel further includes a seamless, integral cellular-core section seamlessly interposed between the seamless, integral first facesheet and the seamless, integral second facesheet, with the seamless integral cellular-core section including a plurality of seamless cells, with the plurality of seamless cells each comprising a plurality of seamless-cell walls, and with the plurality of seamless-cell walls defining a seamless-cell chamber in each of said plurality of seamless cells.

In another aspect, the object is an aircraft-engine housing assembly.

In a further aspect, the object is an aircraft-engine nacelle.

In a further aspect, the object is an aircraft.

In another aspect, the seamless, integral cellular-core section includes a seamless first cellular-core region, with the seamless, first cellular-core region comprising a plurality of seamless first cells including a plurality of seamless first-cell walls defining a seamless, first-cell chamber, with the seamless, first-cell chamber having a selected seamless, first-cell chamber-volume. At least one of said plurality of first cell walls includes a selected first-cell-wall thickness ("t1"), with at least one of said plurality of first-cell walls further including a selected first-cell wall density. The seamless, integral cellular-core section further includes a seamless, second-cellular-core region, with the seamless, second-cellular-core region including a plurality of seamless, second cells including a plurality of seamless, second-cell walls defining a seamless, second-cell chamber having a selected seamless, second-cell chamber volume, with at least one of the plurality of second-cell walls comprising a selected seamless, second-cell-wall thickness ("t2"), with at least one of said plurality of second-cell walls further including a selected second-cell wall density, and with the seamless, second cellular-core region positioned adjacent the seamless, first cellular-core region.

In another aspect, at least one of said plurality of seamless first-cell walls is perpendicular to at least one of the seamless, integral first facesheet and the seamless, integral second facesheet.

In another aspect, at least one of said plurality of seamless, second-cell walls is perpendicular to at least one of the seamless, integral first facesheet and the seamless, integral second facesheet.

In another aspect, at least a portion of at least one of the plurality of seamless, first-cell walls is non-perpendicular to at least one of the seamless, integral first facesheet, and the seamless, integral second facesheet.

In another aspect, at least a portion of at least one of the plurality of seamless, second cell walls is non-perpendicular to at least one of the seamless, integral first facesheet and the seamless, integral second facesheet.

In another aspect, the selected first-cell-chamber volume differs from the selected second-cell-chamber volume.

In a further aspect, the selected first-cell wall-thickness differs from the selected second-cell-wall thickness.

In another aspect, the selected first-cell-wall density is substantially equivalent to the selected second-cell wall density.

In another aspect, the selected first-cell-wall density differs from the selected second-cell wall density.

A further present aspect is directed to a method for tailoring/attenuating sound in an aircraft assembly, with the method including providing an aircraft assembly and integrating into the aircraft assembly a seamless, unitary acoustic panel assembly, with the seamless, unitary acoustic panel including a seamless, integral, first facesheet, a seamless, integral, second facesheet, at least one of said seamless, integral, first facesheet and said seamless, integral second facesheet comprising plurality of perforations that can be a selected pattern of perforations extending through said at least one of the seamless integral first facesheet and the seamless, integral, second facesheet section. The seamless, unitary acoustic panel assembly further includes a seamless, integral, cellular-core section seamlessly interposed between said seamless, integral, first facesheet and the seamless, integral, second facesheet, with the seamless, integral, cellular-core section comprising a plurality of seamless cells, with the plurality of seamless cells comprising a plurality of seamless-cell walls, and wherein at least one of the plurality of seamless cells further includes differing cell properties from at least one of a remainder of the plurality of seamless cells, with the differing cell properties including at least one of differing cell-wall volume, differing cell-wall thickness, differing cell-wall density, and differing cell sound-attenuation ranges.

In a further aspect, each seamless cell includes differing cell properties from at least each of the remainder of the plurality of seamless cells, with the differing cell properties including at least one of differing cell-wall volume, differing cell-wall thickness, differing cell-wall density, and differing cell sound-attenuation ranges.

In another aspect, at least one of the plurality of seamless cells includes a seamless septum, with the seamless septum positioned within the at least one of said plurality of seamless cells, with the seamless septum positioned seamlessly at a selected depth within the at least one of the plurality of seamless cells.

In another aspect, the aircraft assembly is at least one of an aircraft-engine assembly, an aircraft-fuselage assembly, and an aircraft assembly in communication with an airflow.

Another aspect is directed to a method for making a seamless, unitary acoustic panel, with the method including directing a selected amount of a tailorable first feedstock material to a material-deposition machine to form a first-facesheet material, depositing a selected amount of the tailorable first-facesheet material from the material-deposition machine to a base to form a seamless, integral, first facesheet as an integral section of the seamless, unitary acoustic panel. The method further includes, directing a selected amount of a tailorable, second feedstock material to a material-deposition machine to form a seamless, integral, cellular-core material, depositing a selected amount of the seamless, integral, cellular-core material from the material-deposition machine to the seamless, integral, first facesheet to form a seamless, integral, cellular-core structure incorporated into the seamless, integral, first facesheet as a section of the seamless, unitary acoustic panel assembly. The method further includes directing a selected amount of a tailorable, third feedstock material to a material deposition machine to form a second facesheet material, depositing a selected amount of second facesheet material from the material-deposition machine to the seamless integral cellular core structure to form a seamless, integral, second facesheet incorporated into the seamless integral cellular core section as an integral section of the seamless unitary acoustic panel. According to a present method, at least one of the first facesheet material and second facesheet material is deposited onto the seamless, integral, cellular-core structure to form first and second facesheets having a plurality of pre-formed perforations extending through the thickness of at least one of the first and second facesheets formed into the seamless, unitary acoustic panel. According to present aspects, the perforations are formed into at least one of the first and second facesheets during deposition of the first facesheet material and the second facesheet material. The seamless, integral, first facesheet, the seamless, integral, cellular-core section, and the seamless, integral, second facesheet are deposited to, together, form the seamless, unitary acoustic panel.

In another aspect, at least one of the tailorable first feedstock material and the tailorable third feedstock material comprise a metal.

In anther aspect, the second feedstock material comprises a metal.

In another aspect, the second feedstock material is different from the first feedstock material, and the second feedstock material is different from the third feedstock material.

In a further aspect, the material-deposition machine is a large-area 3-D printer.

A further aspect is directed to a seamless, unitary acoustic panel, with the seamless, unitary acoustic panel including a seamless, integral, first facesheet, a seamless, integral, second facesheet, with at least one of the seamless, integral, first facesheet and the seamless, integral, second facesheet including a selected pattern of a plurality of perforations extending through the thickness of the at least one of the seamless, integral, first facesheet and the seamless, integral, second facesheet. The seamless, unitary acoustic panel further includes, a seamless, integral, cellular-core section seamlessly interposed between the seamless, integral, first facesheet and the seamless, integral, second facesheet, with the seamless, integral, cellular-core section comprising a plurality of seamless cells, with the seamless cells comprising seamless cell walls, and with the seamless, unitary acoustic panel made according to a method presented herein.

In another aspect, in the seamless unitary acoustic panel made according to a disclosed method, at least one of the plurality of seamless cells further includes differing cell properties from at least one of a remainder of the plurality of seamless cells, with the differing cell properties comprising at least one of differing cell-wall volume, differing cell-wall thickness, differing cell-wall density, and differing cell sound-attenuation ranges.

In another aspect, in the seamless, unitary acoustic panel made according to a disclosed method, the seamless, integral, cellular-core section includes a seamless first cellular-core region, with the seamless first cellular-core region including a plurality of seamless first cells, each of the plurality of seamless first cells including a plurality of seamless first-cell walls. The seamless, integral, cellular-core section further includes a seamless second cellular-core region, with the seamless second cellular-core region positioned adjacent the seamless first cellular-core region, and with the seamless second cellular-core region including a plurality of seamless second cells, with each of the plurality of seamless second cells including a plurality of seamless second-cell walls.

In another aspect, in the seamless unitary acoustic panel made according to a disclosed method, at least one of the plurality of seamless first cells in the seamless first cellular-core region includes at least a portion of at least one of the plurality of seamless first cell walls oriented non-perpendicularly to at least one of the seamless integral first facesheet section and the seamless integral second-facesheet section.

In a further aspect, in the seamless unitary acoustic panel made according to a disclosed method, at least one of said plurality of seamless second cells in the seamless second cellular-core region includes at least a portion of at least one of the plurality of seamless second cell walls oriented non-perpendicularly to at least one of the seamless integral first facesheet section, and the seamless, integral, second-facesheet section.

In another aspect, in the seamless unitary acoustic panel made according to a disclosed method at least one of the plurality of seamless first cells further comprises differing cell properties from the at least one of the plurality of seamless second cells, said differing cell properties including at least one of differing cell-wall volume, differing cell-wall thickness, differing cell-wall density, and differing cell sound-attenuation ranges.

Another aspect is directed to a seamless cellular-core structure, with the seamless cellular-core structure including a plurality of seamless cells, with the plurality of seamless cells each comprising a plurality of seamless cell walls, and with the plurality of seamless cell walls defining a seamless cell chamber in each of said plurality of seamless cells.

In another aspect, the seamless cell chamber includes a selected seamless cell-chamber volume.

In another aspect, a first seamless cell includes a first selected seamless cell-chamber volume, a second seamless cell comprises a second selected seamless cell-chamber volume, and the said first selected seamless cell-chamber volume differs from the second selected cell-chamber volume of an adjacently positioned seamless cell chamber of at least one the plurality of seamless cells.

In a further aspect, at least one of the plurality of seamless cells includes a seamless septum, with the seamless septum positioned within the at least one of the plurality of seamless cells, with the seamless septum positioned at a first selected depth ("d1") within the seamless cell-chamber of at least one of said plurality of seamless cells, and with the seamless septum integrally formed with the plurality of seamless-cell walls.

In another aspect, the first seamless cell includes a seamless septum positioned at a first selected depth ("d1") within a first seamless-cell chamber, with the second seamless cell comprising a seamless septum positioned at a second selected depth ("d2") within a second seamless-cell chamber, wherein the first selected depth differs from the second selected depth, and with the seamless septum integrally formed with the plurality of seamless-cell walls.

In another aspect, the seamless cellular-core structure includes a seamless first cellular-core region, with the seamless, first cellular-core region comprising a plurality of seamless first cells including a plurality of seamless first-cell walls defining a seamless, first-cell chamber, with the seamless, first-cell chamber having a selected seamless, first-cell chamber-volume. At least one of said plurality of first cell walls includes a selected first-cell-wall thickness ("t1"), with at least one of said plurality of first-cell walls further including a selected first-cell wall density. The seamless cellular-core structure further includes a seamless, second-cellular-core region, with the seamless, second-cellular-core region including a plurality of seamless, second cells including a plurality of seamless, second-cell walls defining a seamless, second-cell chamber having a selected seamless, second-cell chamber volume, with at least one of the plurality of second-cell walls comprising a selected seamless, second-cell-wall thickness ("t2"), with at least one of said plurality of second-cell walls further including a selected second-cell wall density, and with the seamless, second cellular-core region positioned adjacent the seamless, first cellular-core region.

In another aspect, the selected first-cell-chamber volume differs from the selected second-cell-chamber volume.

In a further aspect, the selected first-cell wall-thickness differs from the selected second-cell-wall thickness.

In another aspect, the selected first-cell wall density is substantially equivalent to the selected second-cell wall density.

In another aspect, the selected first-cell wall density differs from the selected second-cell wall density.

In another aspect a seamless, unitary, one-piece acoustic panel comprises the cellular core structure.

A further aspect is directed to an aircraft comprising the seamless, unitary, cellular-core structure.

Another aspect is directed to an aircraft assembly comprising the seamless, cellular-core structure.

Another aspect is directed to a method for making a seamless, unitary cellular-core structure, with the method including directing a selected amount of a tailorable first feedstock material to a material-deposition machine to form a first cellular-core material comprising a first density, depositing a selected amount of the first cellular-core material from the material-deposition machine, and forming a seamless, unitary cellular-core structure having a plurality of seamless cells, with the seamless cells including a plurality of seamless cell walls.

In another aspect, the method further includes doping, in real time, at least a portion of the selected amount of the tailorable first cellular-core material with a second feedstock material to change a characteristic of the tailorable first feedstock material and to form a second cellular-core material, with the second cellular-core material comprising a second density, and with the second density differing from the first density. A method further includes depositing a selected amount of the second cellular-core material from the material-deposition machine, and forming at least a portion of the seamless, unitary cellular-core structure, with the seamless, unitary cellular-core structure having a plurality of seamless cells, with the seamless cells including a plurality of seamless cell walls, with at least one of the plurality of seamless cell walls having the first density and wherein at least one of the plurality of seamless cell walls having the second density.

In a further aspect, the material-deposition machine is a large-area 3-D printer.

A further aspect is directed to a seamless, unitary cellular-core structure made according to a method disclosed herein.

In another aspect, an aircraft includes a seamless, unitary cellular-core structure made according to a method disclosed herein.

In another aspect, an aircraft assembly includes a seamless, unitary cellular-core structure made according to a method disclosed herein.

In another aspect, a seamless, unitary, one-piece acoustic panel includes the seamless, unitary cellular-core structure made according to a method disclosed herein.

In another aspect, the tailorable feedstock material comprises a metal.

In another aspect, the tailorable feedstock comprises at least one of aluminum, aluminum alloy, titanium, and titanium alloy.

In another aspect, the material-deposition machine is a large-area 3-D printer.

In another aspect, in the cellular-core structure made according to a disclosed method, at least one of the plurality of seamless cells further includes differing cell properties from at least one of a remainder of the plurality of seamless cells, with the differing cell properties comprising at least one of differing cell-wall volume, differing cell-wall thickness, differing cell-wall density, and differing cell sound-attenuation ranges.

In another aspect, in the seamless, cellular-core structure made according to a disclosed method, the seamless, cellular-core structure includes a seamless first cellular-core region, with the seamless first cellular-core region including a plurality of seamless first cells, each of the plurality of seamless first cells including a plurality of seamless first-cell walls. The seamless, unitary cellular-core structure further includes a seamless second cellular-core region, with the seamless second cellular-core region positioned adjacent the seamless first cellular-core region, and with the seamless second cellular-core region including a plurality of seamless second cells, with each of the plurality of seamless second cells including a plurality of seamless second-cell walls.

In a further aspect, the seamless, unitary cellular-core structure disclosed herein and/or made according to present methods comprises at least one of aluminum, aluminum alloy, titanium, titanium alloy, steels alloy, and combinations thereof.

In a further aspect, the seamless, unitary cellular-core acoustic panel disclosed herein and/or made according to present methods comprises at least one of aluminum, aluminum alloy, titanium, titanium alloy, steel alloy, and combinations thereof.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
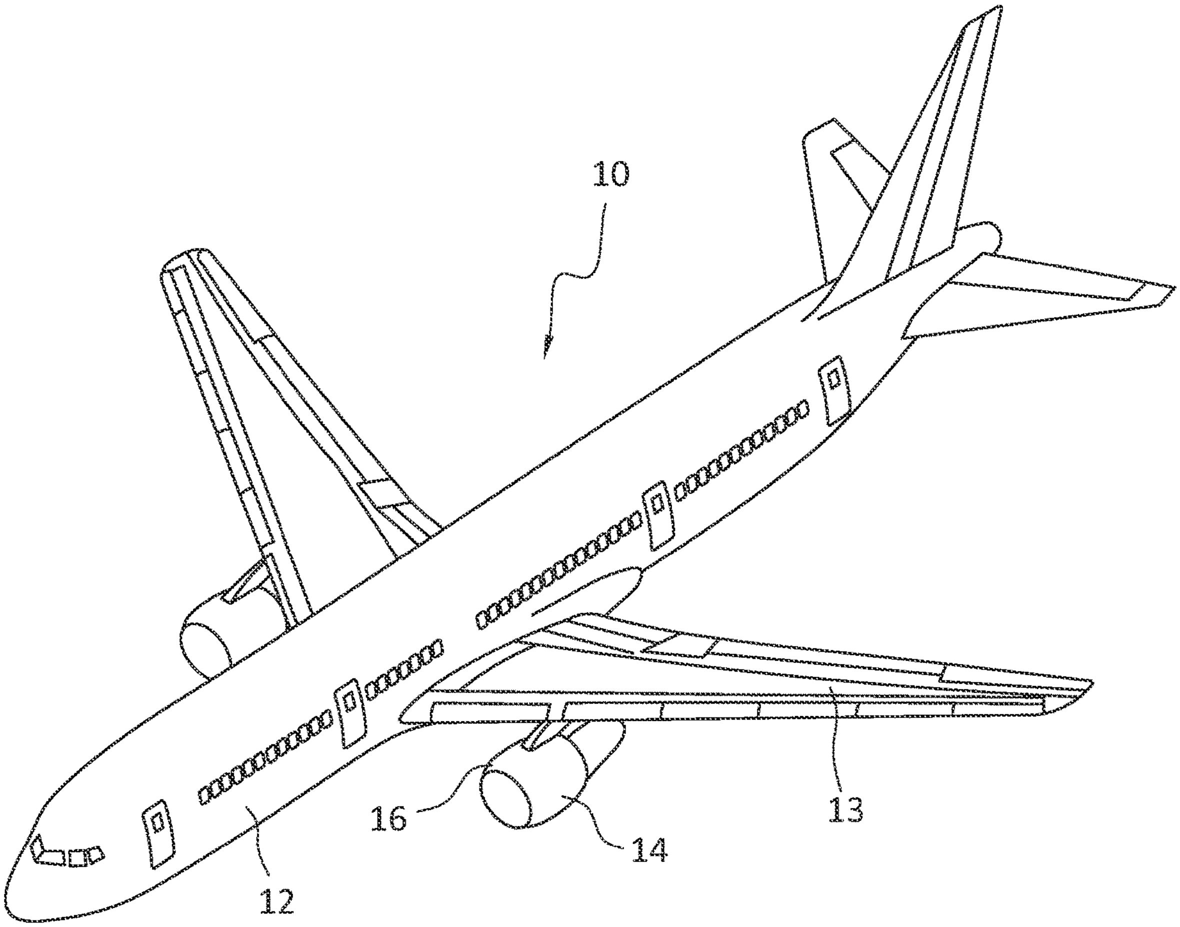
Figure 2A:
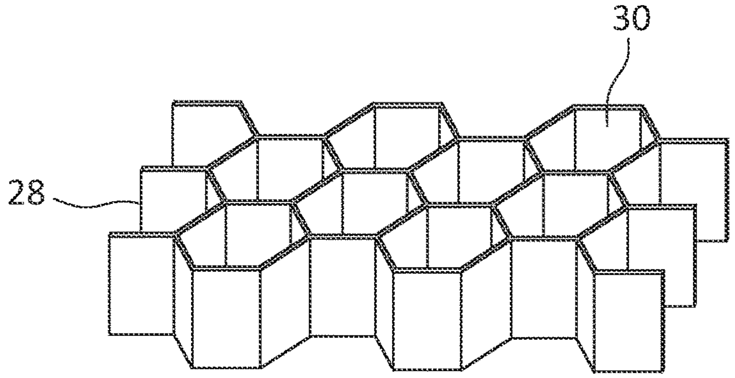
Figure 2B:
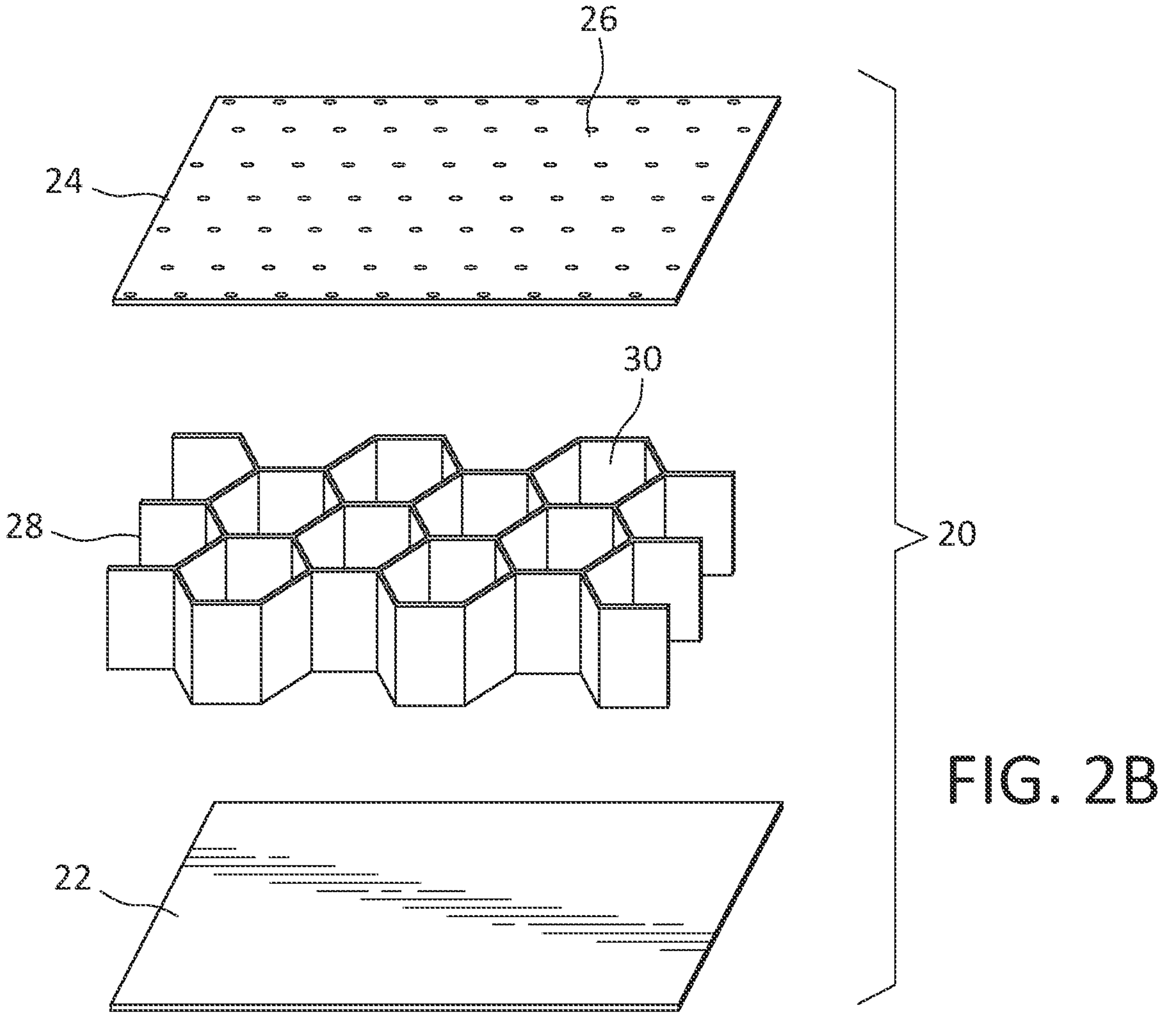
Figure 3:
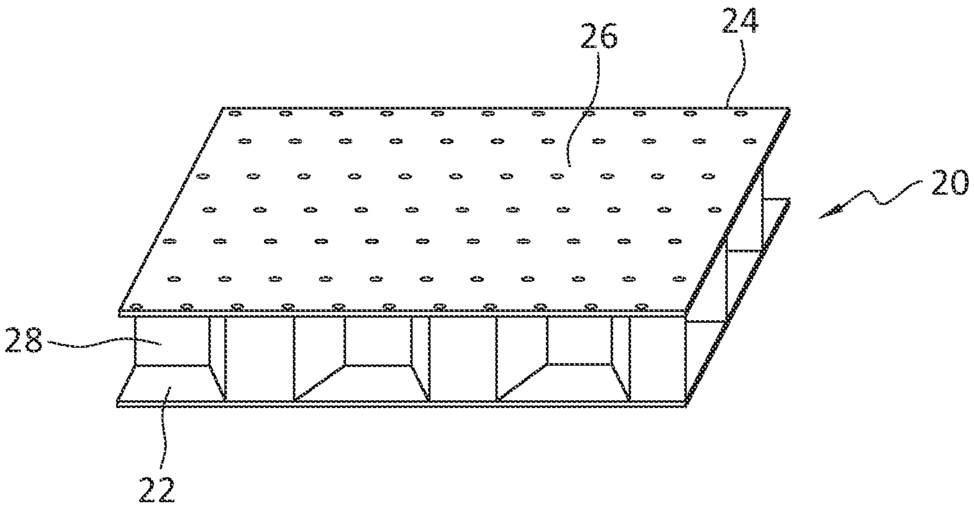
Figure 4A:
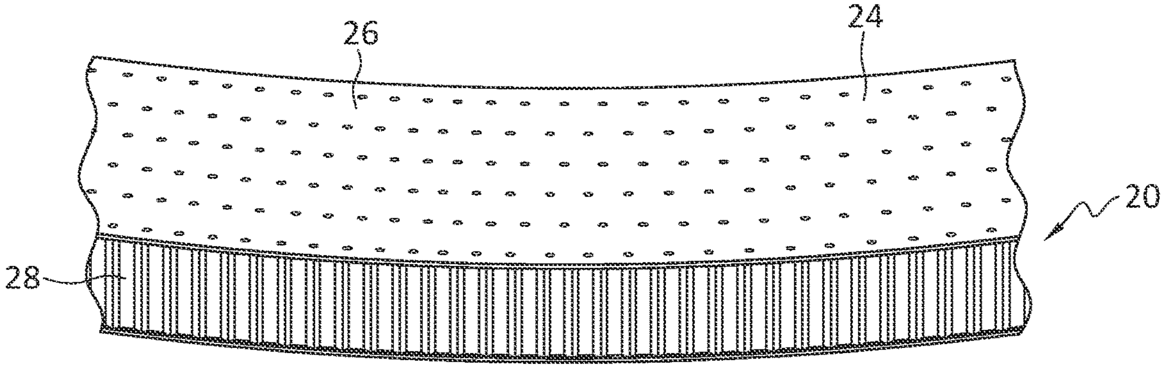
Figure 4B:
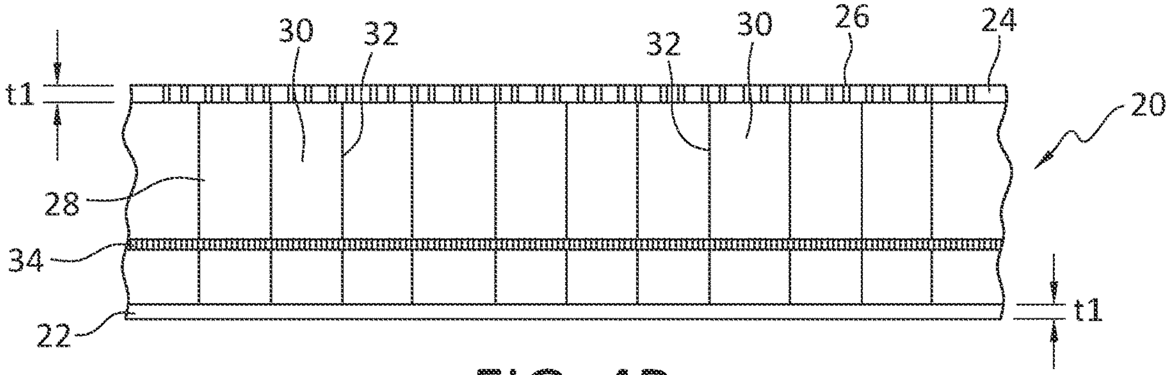
Figure 5:
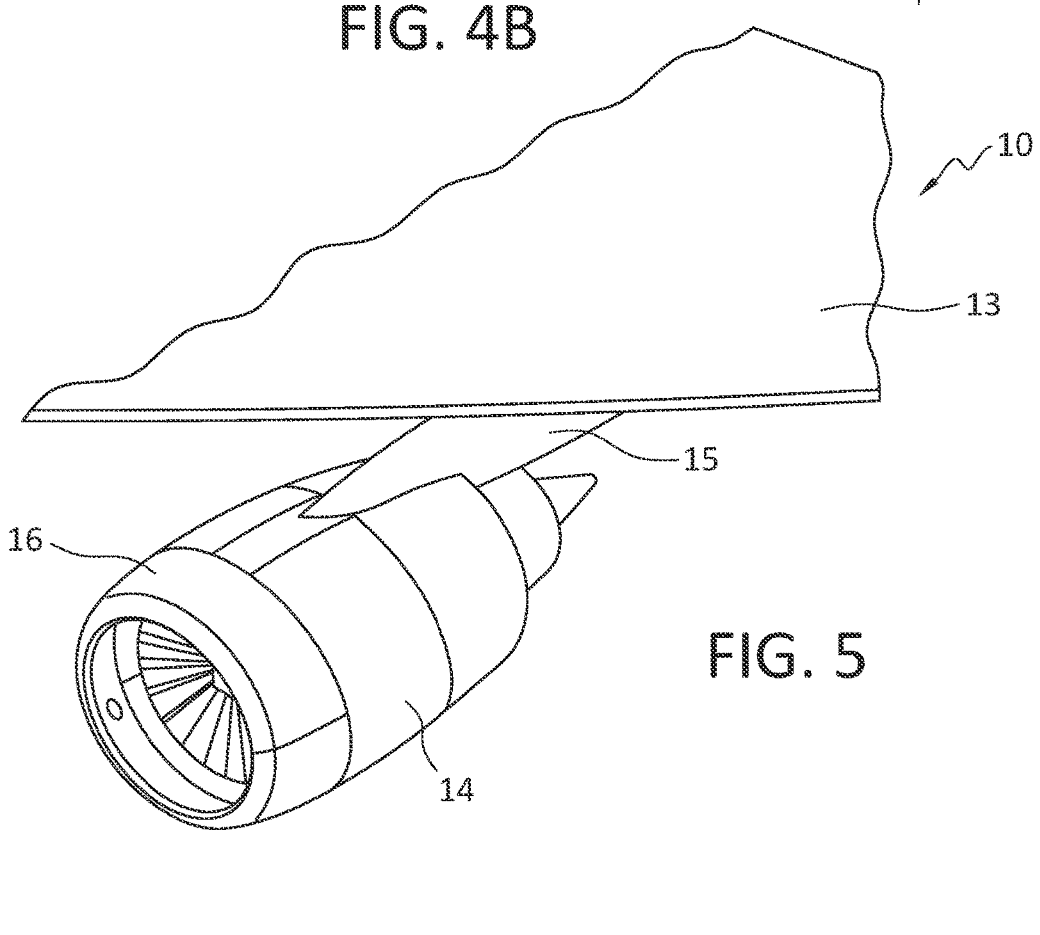
Figure 6A:
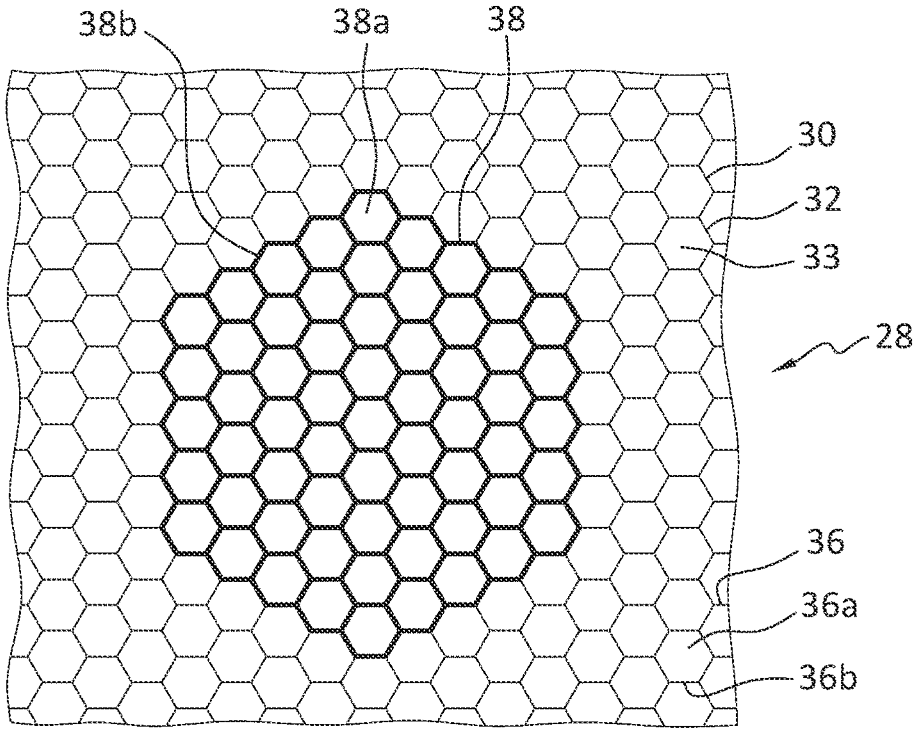
Figure 6B:
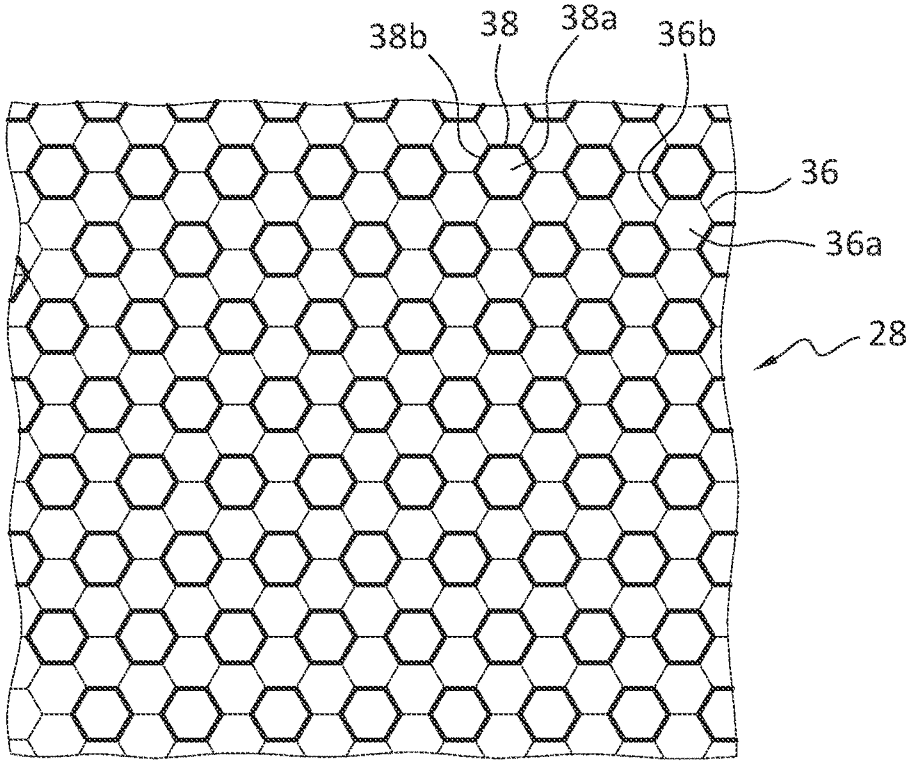
Figure 7:
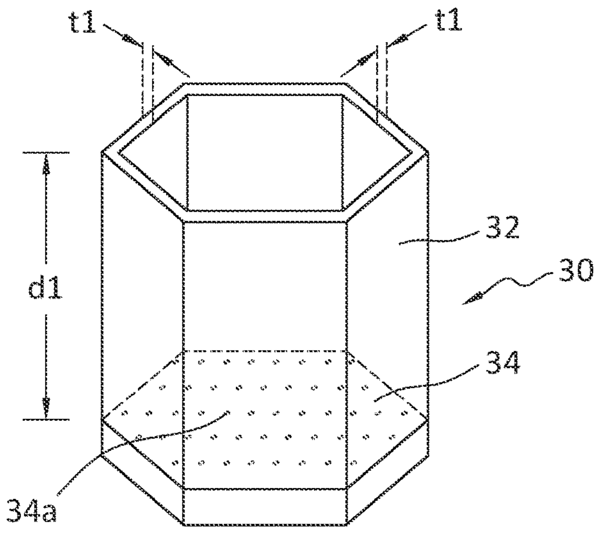
Figure 8A:
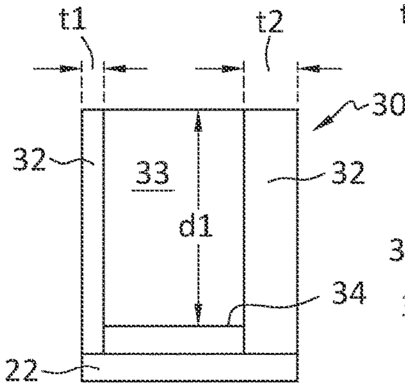
Figure 8B:
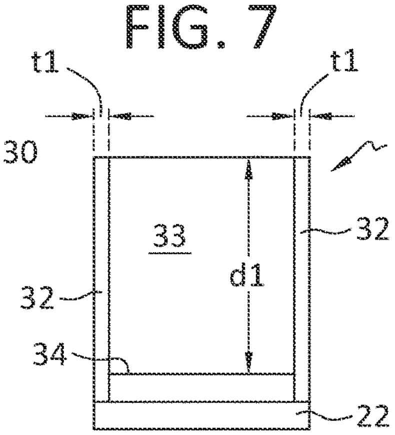
Figure 8C:
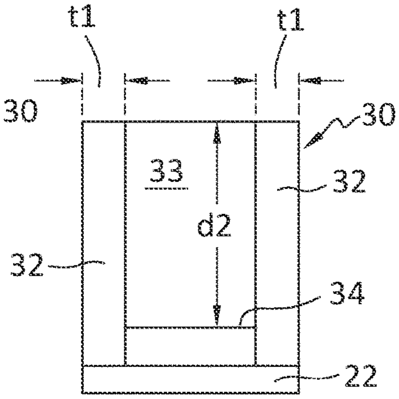
Figure 9A:
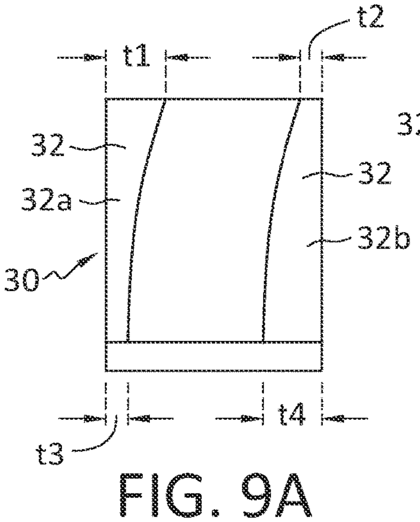
Figure 9B:
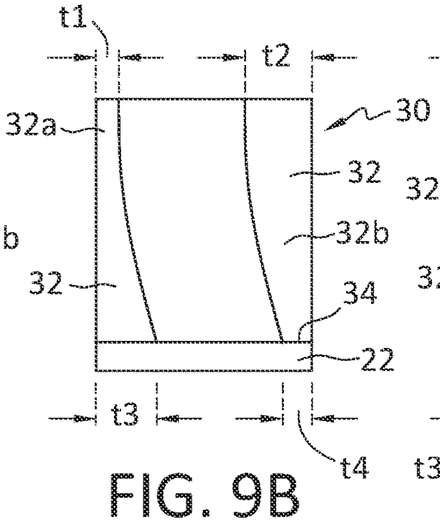
Figure 9C:
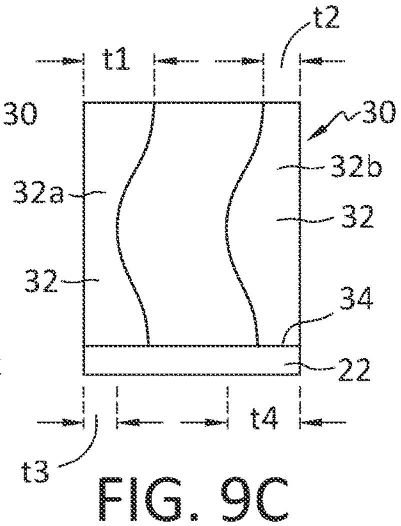
Figure 10:
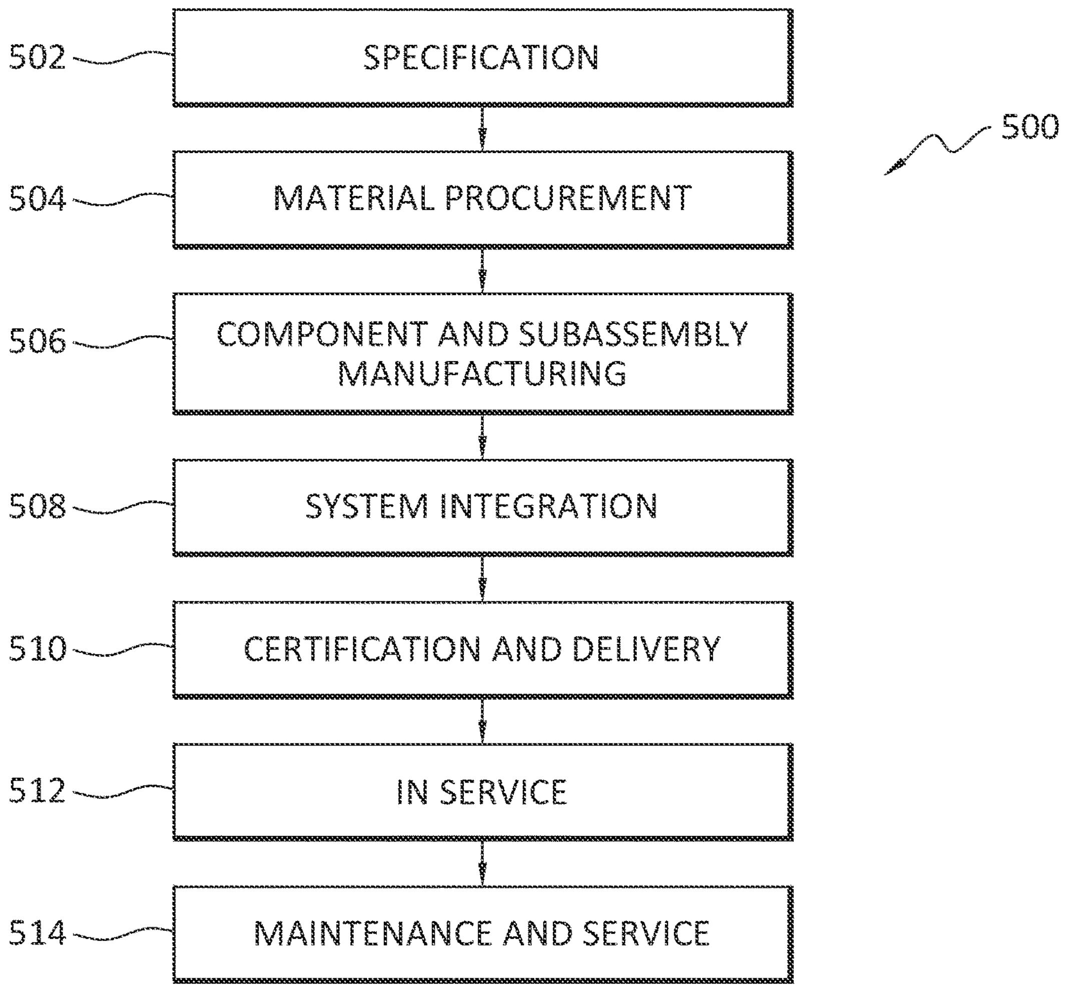
Figure 11:
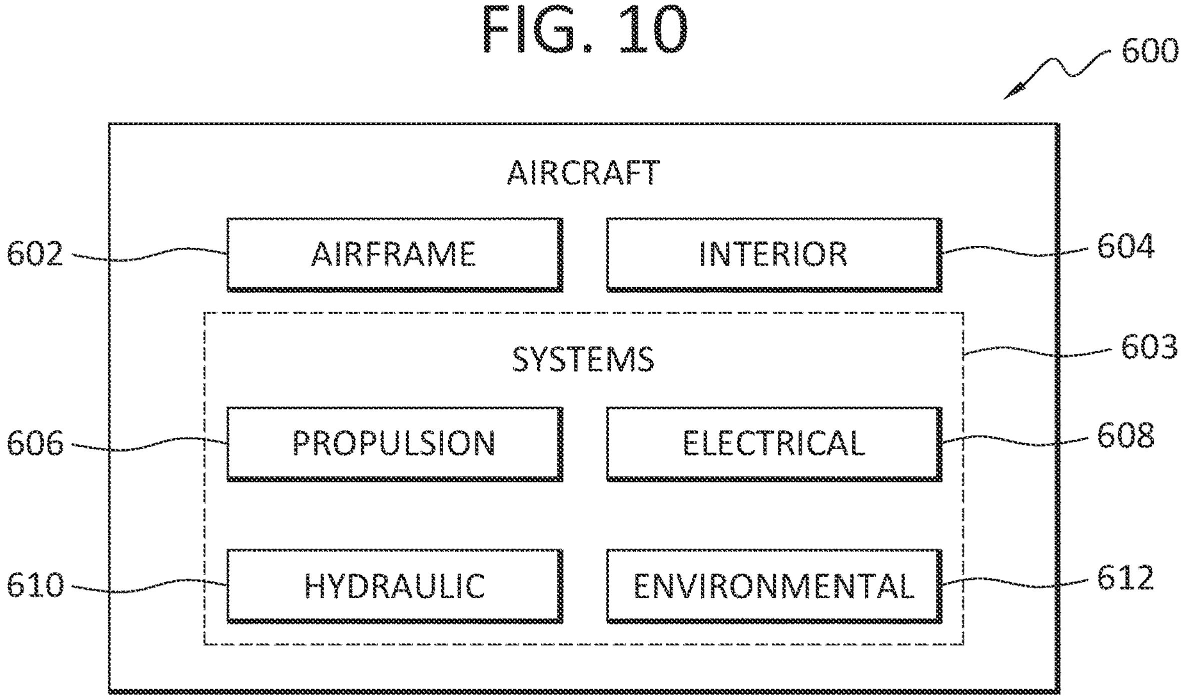
Figure 12A:
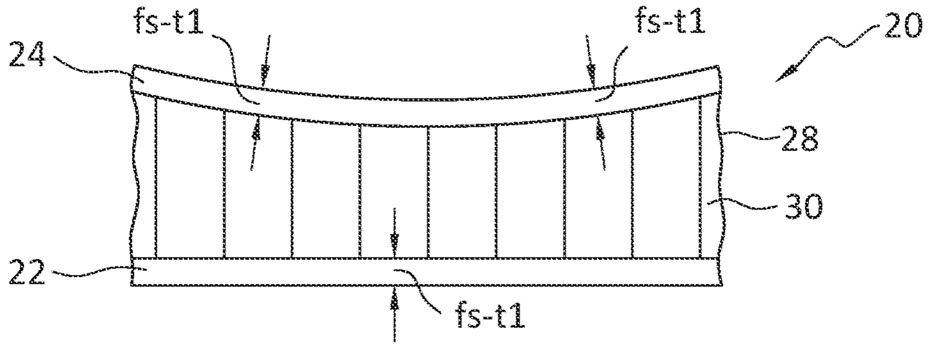
Figure 12B:
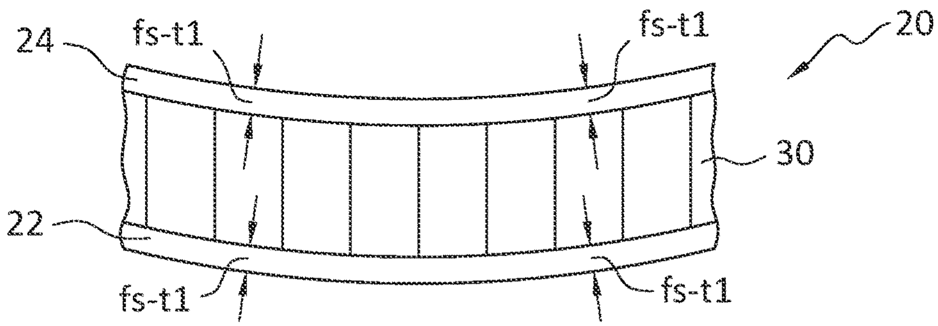
Figure 12C:
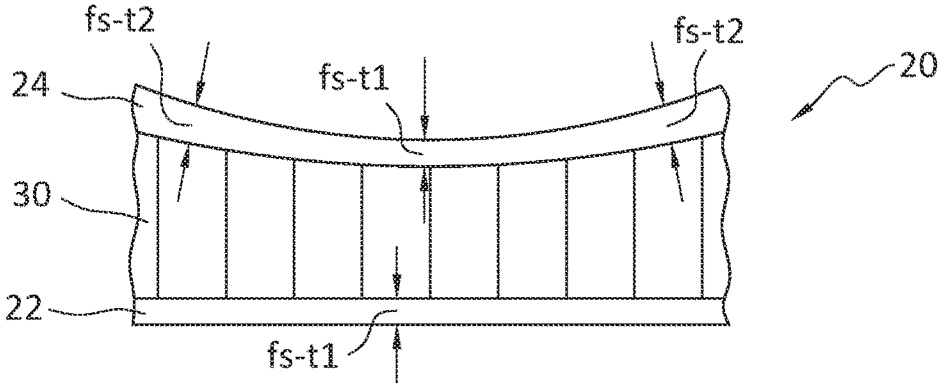
Figure 12D:
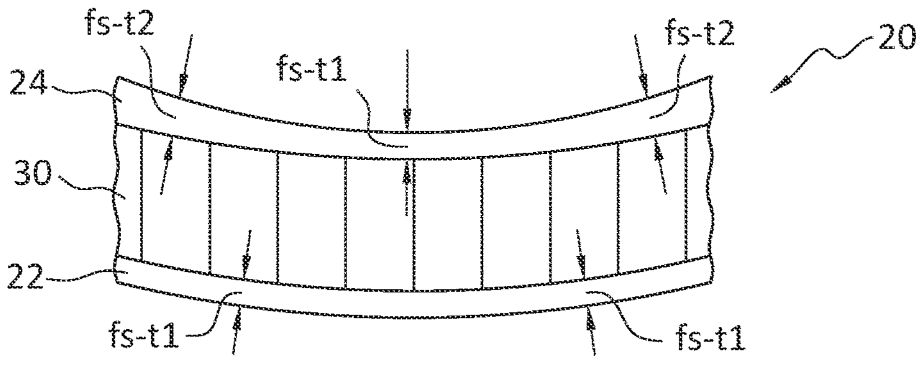
Figure 12E:
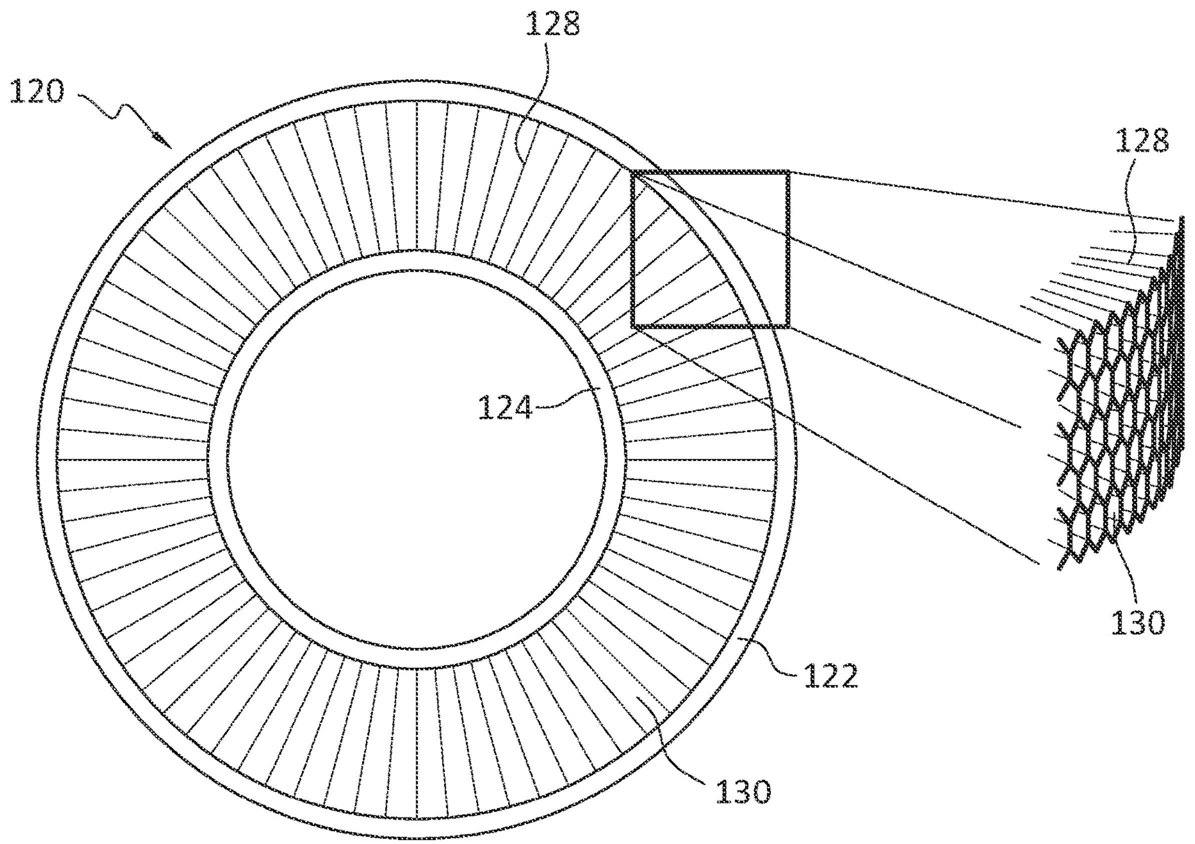
Figure 13:
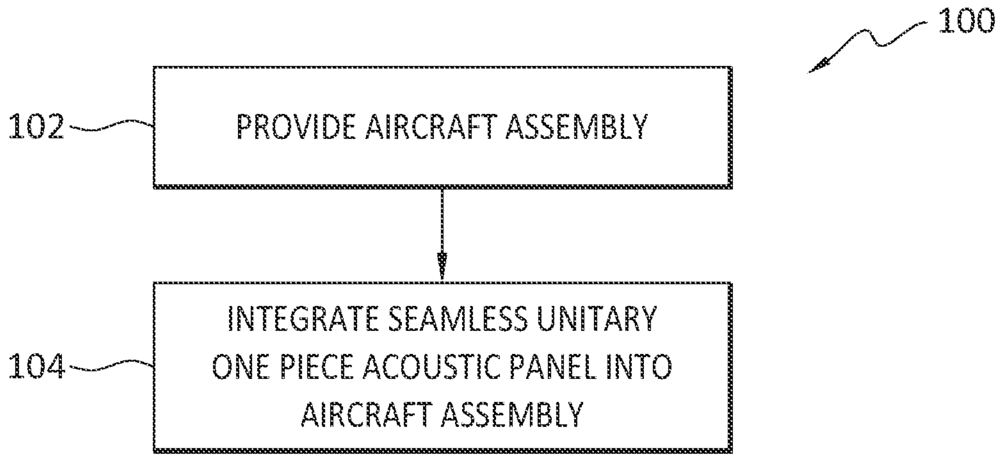
Figure 14:
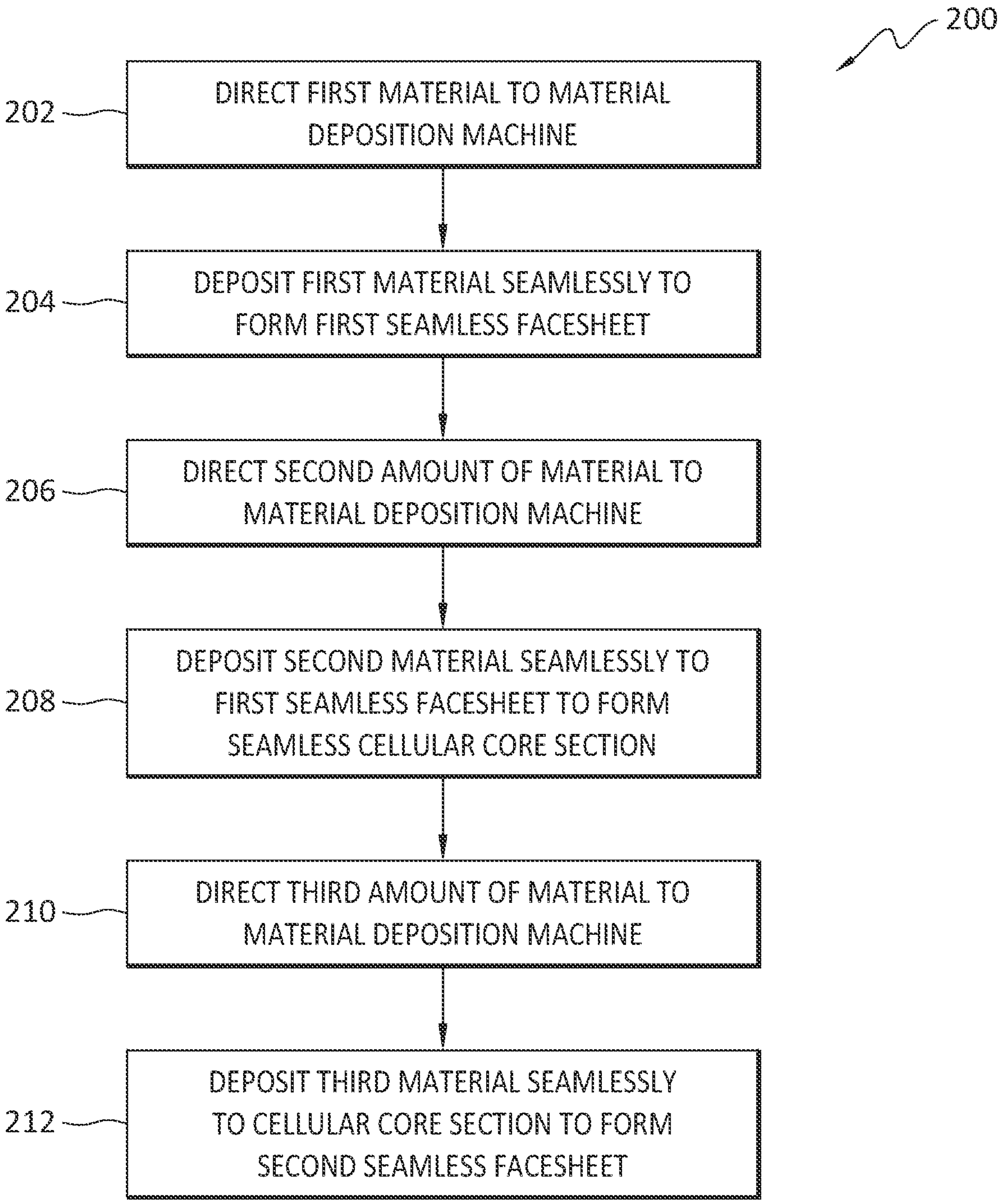
Figure 15:
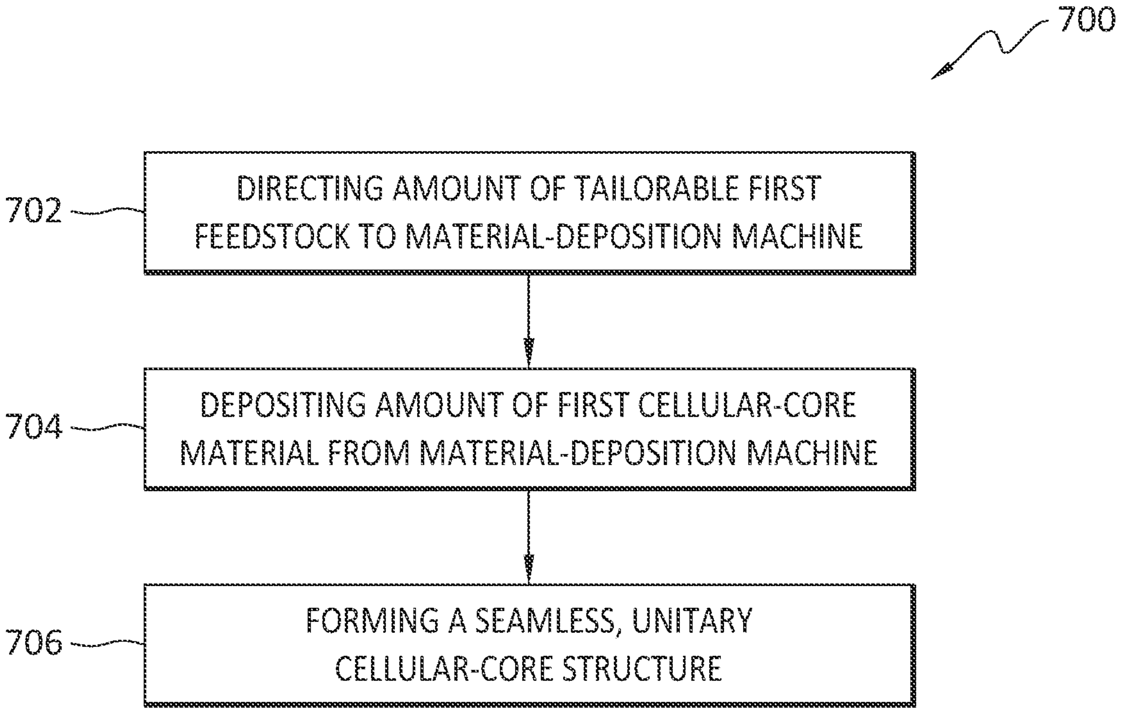
Figure 16:
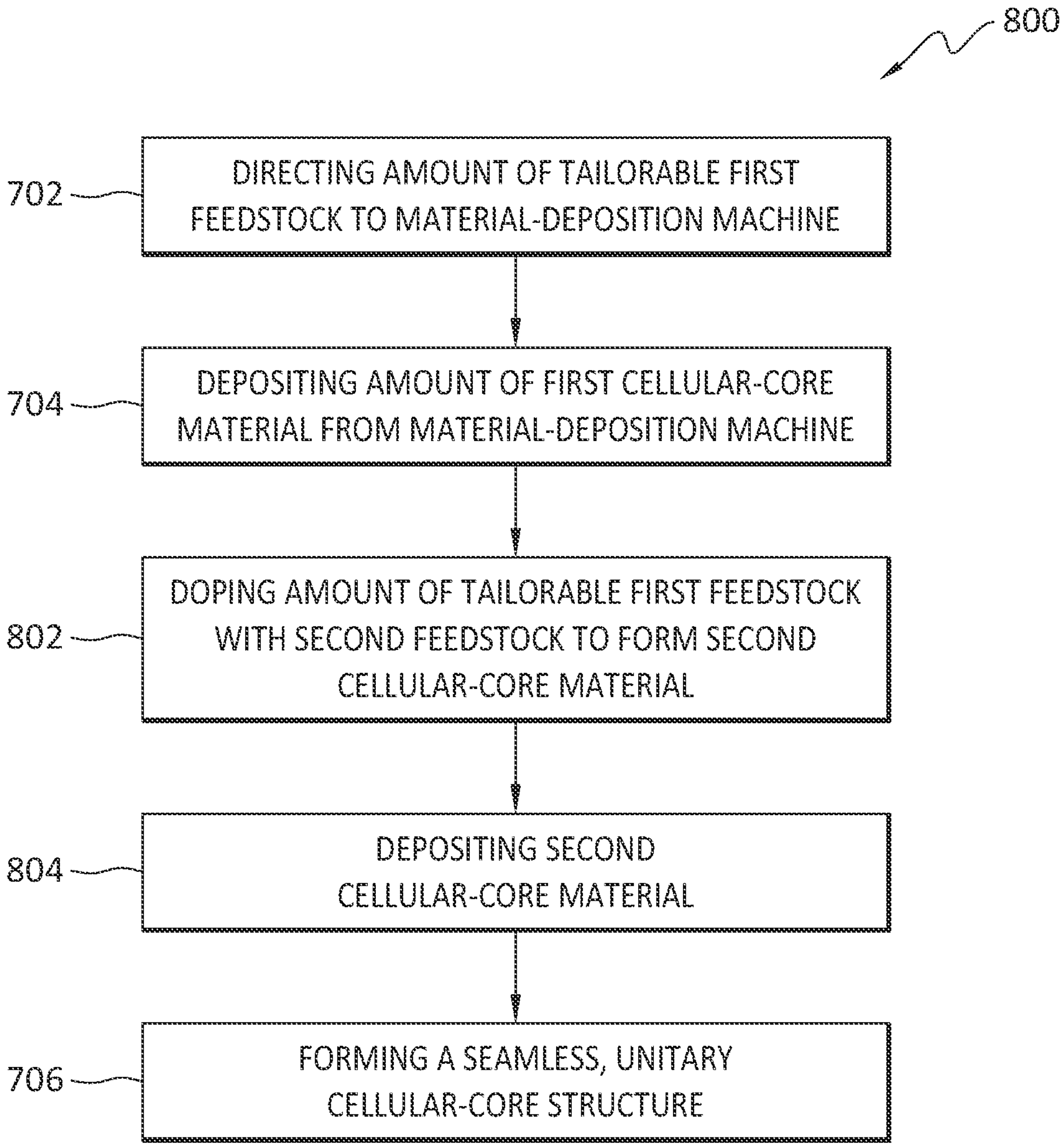

Having thus described variations of the disclosure in general terms, reference will now be made to the accompanying drawings, which are not necessarily drawn to scale, and wherein:

FIG. 1 is an illustration of an aircraft, according to present aspects;

FIG. 2A is a perspective view of a tailorable, seamless, unitary cellular-core structure, according to present aspects;

FIG. 2B is an exploded view showing sections of a tailorable, seamless, unitary sound-attenuation panel, according to present aspects;

FIG. 3 is an illustration of a tailorable, seamless, unitary, sound-attenuation panel, according to present aspects;

FIG. 4A is an enlarged perspective view of tailorable, seamless, unitary sound-attenuation panel, according to present aspects;

FIG. 4B is an enlarged side view of tailorable seamless, unitary, sound-attenuation panel, according to present aspects;

FIG. 5 is a partial view of an aircraft-engine, according to present aspects;

FIG. 6A is an overhead plan view of a tailorable, seamless, integral cellular-core section of a tailorable, seamless, unitary, sound-attenuation panel, according to present aspects;

FIG. 6B is an overhead plan view of a tailorable, seamless, integral cellular-core section of a tailorable, seamless, unitary, sound-attenuation panel, according to present aspects;

FIG. 7 is a perspective view of a tailorable, seamless cell of a tailorable, seamless, integral cellular-core section of a tailorable, seamless, unitary, sound-attenuation panel, according to present aspects;

FIG. 8A is a cross-sectional side view of a tailorable, seamless cell of a seamless, integral cellular-core section of a tailorable, seamless, unitary, sound-attenuation panel having non-uniform, or variable, seamless cell-wall thickness along its length, according to present aspects;

FIG. 8B is a cross-sectional side view of a tailorable, seamless cell of a seamless, integral cellular-core section of a tailorable, seamless, unitary, sound-attenuation panel, with the tailorable, seamless cell having substantially uniform seamless cell-wall thickness along its length, according to present aspects;

FIG. 8C is a cross-sectional side view of a tailorable, seamless cell of a tailorable, seamless, integral cellular-core section of a tailorable, seamless, unitary, sound-attenuation panel having substantially uniform seamless cell-wall thickness along its length, according to present aspects;

FIG. 9A is a cross-sectional side view of a tailorable, seamless cell of a tailorable seamless, integral cellular-core section of a tailorable, seamless, unitary, sound-attenuation panel having non-uniform seamless cell-wall thickness along its length, according to present aspects;

FIG. 9B is a cross-sectional side view of a tailorable, seamless cell of a tailorable, seamless, integral cellular-core section of a tailorable, seamless, unitary, sound-attenuation panel, with the tailorable, seamless cell having substantially non-uniform, or variable, seamless cell-wall thickness along its length, according to present aspects;

FIG. 9C is a cross-sectional side view of a tailorable, seamless cell of a tailorable, seamless, integral cellular-core section of a tailorable, seamless, unitary, sound-attenuation panel having substantially non-uniform, or variable, seamless cell-wall thickness along its length, according to present aspects;

FIG. 10 is a flow diagram of aircraft production and service methodology;

FIG. 11 is a block diagram of an aircraft;

FIG. 12A is a cross-sectional side view of a tailorable, seamless, unitary acoustic panel, according to present aspects;

FIG. 12B is a cross-sectional side view of a tailorable, seamless, unitary acoustic panel, according to present aspects;

FIG. 12C is a cross-sectional side view of a tailorable, seamless, unitary, acoustic panel, according to present aspects;

FIG. 12D is a cross-sectional side view of a tailorable, seamless, unitary, acoustic panel, according to present aspects;

FIG. 12E is a cross-sectional plan view of a tailorable, seamless, unitary, acoustic panel, according to present aspects;

FIG. 13 is a flowchart outlining a method, according to present aspects;

FIG. 14 is a flowchart outlining a method, according to present aspects;

FIG. 15 is a flowchart outlining a method, according to present aspects; and FIG. 16 is a flowchart outlining a method, according to present aspects.

DETAILED DESCRIPTION

Acoustic paneling includes structures that are specifically designed to absorb, control, or reflect sound away from a particular area. For example, acoustic paneling may be used to reduce the auditory impact of aircraft-engines during takeoff, flight, and landing. Acoustic paneling within an aircraft may further reduce and/or redirect aircraft noise during takeoff and landing. Such noise reduction and redirection may be environmentally mandated via regulations, but is also desirable for passengers within an aircraft.

Typically, acoustic paneling is assembled from a number or separate/discrete parts to conform the paneling to the complex geometries of an aircraft assembly and aircraft structures. Each cell in an acoustic panel can comprise a septum, and, over the area of an entire aircraft, there may be thousands of such cells, with each cell in an acoustic panel comprising a separately installed septum.

In addition, sound-attenuation panels can comprise multiple and separate panel sections and a significant plurality of separate components, or separate parts, and separate panel sections that are physically combined together into a sound-attenuation panel that can be of a sandwich-type construction that comprises seams at the junction where panel parts and panel sections are joined. Such typical sandwich-type sound-attenuation panels can comprise a separate honeycomb structure that is sandwiched between two separate facesheets that are adhered or otherwise joined to the "sandwiched" honeycomb structure.

Typically, a sandwiched honeycomb structure (e.g., a cellular-core panel) comprises a plurality of cells that can attenuate sound by cancelling, or otherwise attenuating, a portion of the soundwaves according to their frequency. With respect to typical sound-attenuating panels currently in use, the ability of the panels to alter sound waves to a desired degree is achieved through a fixed number of available variables that combine to offer a sound-panel attenuation "solution". However, sound designers and sound engineers are typically limited by the parameters, or variables, for sound-panel construction that has previously involved the construction of multiple separate parts or components into one or more sound-attenuation panels and sound-attenuation panel sections that can be combined to attenuate sound from a particular sound-emitting source that can include, for example, an aircraft-engine assembly.

That is, the construction and desired performance of typical sound-attenuation panels (e.g., in aircraft assemblies) can be limited by the mechanical properties of the separate sound-attenuation parts and components that are combined into a finished sound-attenuation panel. In addition, the construction and desired performance of typical sound-attenuation panels can be further limited and otherwise frustrated by the labor-intensive methods, and the incorporation of further materials that are used to join the several separate sound-attenuation panel parts or components into a finished sound-attenuation panel (that comprises the many several components/parts that are joined together, and panel sections that are joined together, etc.). For example, if variations among cells in a cell-core structure are desired, varying cell sections must be spliced into place in the cellular-core requiring the removal of a cellular-core section of cells from the cellular-core, followed by the insertion and "splicing in" of a separate cellular-core section of cells, with the "spliced in" section requiring an adhesive and separate labor-intensive bonding steps.

The traditional incorporation of additional joining materials, as well as the methods of joining the many component parts, can also result in, and otherwise cause, additional design and manufacturing complexity that can further frustrate or complicate the desired end result of the sound-attenuation panel that is constructed from the many separate parts. For example, when several separate parts are joined to form a finished sound-attenuation panel, via, for example, the application of adhesive layers, welding, etc., additional, discrete layers can be formed at the juncture (e.g., intersection, formed or created seam, etc.) of the separate components/parts that are joined together. The typical resulting seams that are formed at the junction of the separate parts and panel sections that are joined together can form additional layers, seam regions, etc., that can impact panel performance, can add overall weight to an aircraft assembly (as well as the aircraft into which the aircraft assembly is incorporated), can create seams of varying dimension and quality between and among panel components that may require rework, and that can otherwise create additional manufacturing and design complexities, create added inspection steps, require rework, etc.

In strong contrast to typical aircraft sound-attenuation-panel apparatuses and systems, and typical cellular-core sections joined within such panels that are typically available, the presently disclosed tailored, seamless, unitary, cellular-core sections and tailored acoustic panels that integrally incorporate the tailored, seamless, unitary, cellular-core section provide significantly enhanced and tailored aircraft sound-attenuation solutions, with the tailored panels manufactured, seamlessly, into a one-piece, or unitary construction for the purpose of providing selected tailored sound-attenuation capabilities in the presently disclosed tailored, seamless, unitary, sound-attenuation acoustic panels.

According to present aspects, the terms "unitary", "unitary construction", "one-piece", and "one-piece construction" are equivalent terms used equivalently and interchangeably herein. The presently disclosed aircraft sound-attenuation panels and the cellular-core sections (comprising a plurality of cells, etc.) of the unitary panel comprise no seams, joints, welds, etc. Accordingly, the present cellular-core section comprises a plurality of tailored cells produced seamlessly and that can be individually tailored to individual cell specifications. The cells of the cellular core have no seams between individual cells. The cellular-core section has no seams between features introduced into each cell (e.g., cell walls, septums, etc.), and the acoustic panel that can comprise the present cellular-core section has no seams between the facesheets that are produced integrally with the cellular-core section as one "unit", and that is therefore a "unitary" construction.

For simplicity, the present application uses the term "seamless" to connote, describe, capture, describe, and otherwise define and include the terms "unitary", "integral" and "one-piece". Accordingly, the seamless, unitary, one-piece cells, the seamless, unitary, one-piece cellular core section, the seamless, unitary, one-piece acoustic panel, etc. are referred to equivalently herein, as "seamless, unitary, cells", "seamless, unitary, cellular-core section", "seamless, unitary, core", "seamless, unitary, acoustic panel", etc. In using the term "seamless", it is therefore understood that the part described as "seamless" is also manufactured as a single piece, and is "one-piece", and further is a "unitary" piece that is manufactured as a single unit.

Further, the presently disclosed seamless, aircraft sound-attenuation panels do not incorporate multiple parts, and the presently disclosed seamless, aircraft sound-attenuation panels comprise no joining, welding, or other manufacturing steps that typically bring together a multiplicity of parts and panel sections into a finished assembly. Instead, the presently disclosed seamless, acoustic panel is fabricated as a single piece, with no seams throughout the acoustic panel, even though the acoustic panel may comprise various sections that are seamless throughout the one piece-construction. According to present aspects, the presently disclosed aircraft sound-attenuation panel can be a type of "acoustic liner" (referred to equivalently herein as an "acoustic panel") that can be incorporated into an aircraft assembly.

FIG. 1 is an illustration of an object in the form of an aircraft 10 that can incorporate the tailorable sound-attenuating sound panel of the present disclosure. As shown in FIG. 1, aircraft 10 includes a fuselage 12, a wing structure 13, and aircraft-engine assemblies that can be in communication with a wing structure 13, with the aircraft-engine assembly 14 further incorporating a nacelle 16. While present apparatuses, structures, and methods are described in the context of providing sound-attenuation solutions for aircraft, the present application is not limited to incorporation of the disclosed structures into aircraft. The present apparatuses, systems, and methods can be incorporated into and are otherwise presently contemplated as offering an improved sound-attenuation solution for a wide array of objects including, for example and without limitation, mobile objects (crewed and uncrewed civilian vehicles, crewed and uncrewed military vehicles, rockets, drones, etc.) as well as stationary objects (buildings, including for example, energy-generation facilities, manufacturing facilities, and other facilities where sound generation occurs and sound attenuation is desired, etc.).

According to present aspects, if desired, the seamless, cellular-core section 28 shown in FIG. 2A, can be made as a "standalone" structure that comprises a plurality of seamless cells 30. Present aspects contemplate the manufacture of a seamless, cellular-core structure 28 of the type shown in FIG. 2A that can have end uses that can be distinct from the end uses contemplated by the seamless acoustic panels that incorporate the seamless, cellular-core (along with the seamless first and second facesheets) as an integral section of the seamless, acoustic panel.

According to present aspects, properties of the cellular-core section 28, and properties of the individual cells 30 can be selectively tailored. If desired, the properties of each cell can be the same. In another aspect, if desired, one or more properties of each cell 30 can vary from every other cell 30 in the seamless cellular-core section 28. Properties of the individual cells 30 that be varied to tailor the cell can include cell dimension; cell-geometry, cell-chamber dimension; cell-wall thickness, cell-chamber volume, cell orientation, etc. In addition, variables including at least cell-wall density, cell-wall width, cell-chamber dimension, cell-chamber volume, cell-orientation, cell geometry, etc., can be individually tailored during manufacture, in real time, such that the cell-wall density, cell-wall width, cell-chamber dimension, cell-orientation, cell geometry, etc., of one or more cells are not constant along the length of the cell. Further description of the "tailorability" of the cells is shown in at least FIGS. 8A, 8B, 8C, 9A, 9B, 9C.

Further, present aspects are directed to a tailorable, sound-attenuation panel that is seamless, and that includes a plurality of integral facesheets with an integral cellular section "sandwiched" between two facesheets, with an integral, seamless, cellular-core section that can be, for example an integral "honeycomb" cellular-core section. FIG. 3 shows a perspective partially elevated view of a presently disclosed seamless sound-attenuation panel 20 that includes three integral and seamless sections: a seamless first facesheet 22; a seamless cellular-core section 28 located immediately adjacent to, and is a seamless part of, the seamless first facesheet 22; and a seamless second facesheet 24 that is located immediately adjacent to, and is a seamless part of, the seamless cellular-core section 28. The terms "seamless first facesheet" and seamless, integral, first factsheet" and the terms "seamless second facesheet" and "seamless, integral second facesheet" are used equivalently and interchangeably herein. In addition, the terms "seamless cellular-core section" and "seamless, integral cellular-core section" are used equivalently and interchangeably herein.

FIG. 2B shows an exploded view of three "sections" incorporated into seamless acoustic panel 20 (referred to equivalently herein as "panel 20"), of the type shown in FIG. 3. According to present aspects, the three "sections" of the panel 20 are not and are never discrete or separate pieces during the manufacture of panel 20, but are manufactured "unitarily" as a seamless single, unitary, one-piece construction such that the three sections are not separate, and cannot otherwise be separated without the panel sustaining failure and damage, rendering the panel useless for an intended purpose. That is, FIG. 2B is presented herein, for illustration purposes only, and to show the three "sections" that are integrally and seamlessly present in the seamless sound-attenuation panel 20 of the type shown in FIG. 3.

In the FIGs. presented herein (except for FIGS. 1, 5, 10, 11), the solid lines present in the FIGs. that illustrate the presently disclosed seamless acoustic panel do not constitute and are not meant to connote or define a separate part having a seam, or connote or define a separate part that is in any way "joined" to another part. Instead, as shown in the FIGs (except for FIGS. 1, 5, 10, 11) the appearance in the FIGs. of any solid line shown in the illustration of the presently disclosed seamless acoustic panel or any feature of said acoustic panel connotes only a "region" or feature within a seamless, unitary part, with any such "region" or feature fabricated seamlessly with adjoining regions and features and into a unitary, seamless part.

According to present aspects, FIG. 4A shows a slightly elevated view of a seamless, unitary acoustic panel 20 including a seamless, integral first facesheet 22 adjacent a seamless, integral cellular-core section 28. Seamless, integral cellular-core section 28 is further shown in FIG. 4A positioned adjacent seamless, integral second facesheet 24 that further comprises a plurality of perforations that can be a selected pattern of a plurality of perforations that can extend through the thickness of seamless, integral second facesheet 24. The seamless cellular-core section 28 comprises a plurality of seamless cells 30, with each seamless cell 30 comprising a plurality of seamless cell-walls 32 defining a seamless cell-chamber 33 (not visible in FIG. 4A).

According to present aspects, during manufacture of the unitary, one-piece, seamless panel, perforations, and/or patterns of perforations, are formed, during manufacture, into at least one of the seamless, integral first facesheet and/or the seamless, integral second facesheet, with no separate mechanical step required to form such perforations (e.g., no separate drilling step, punching step, etc.). According to present aspects, the totality of the area occupied by the perforations and/or pattern of perforations can comprise a total open area of the seamless integral second facesheet 22 ranging from about 4% to about 14%. In another example, the totality of the area occupied by the perforations and/or pattern of perforations can comprise a total open area of the seamless integral second facesheet 22 ranging from about 4% to about 8%.

FIG. 4B is a side view of the presently disclosed seamless, unitary acoustic panel of the type shown in, for example, FIG. 4A, with FIG. 4B showing the features described in FIG. 4A, and further showing the positioning (within the seamless cell walls 32 of the seamless cells) of a seamless septum 34 located seamless within the seamless cell chamber 33 defined by seamless cell walls 32 in each seamless cell 30.

FIG. 5 shows an enlarged perspective view of a section of aircraft 10 shown in FIG. 1. As shown in FIG. 5, an aircraft wing 13 has a pylon 15 joined to an underside (not visible in FIG. 5) of wing assemble 13, with an aircraft-engine assembly 14 attached to aircraft wing 13 via attachment of the aircraft-engine assembly 14 (that can be, for example, a high-bypass engine) to pylon 15. In one example, pylon 15 can be an integral component of wing 13 or aircraft-engine assembly 14. The seamless, unitary acoustic panel disclosed herein can be configured to be installed within an assembly that can be housed, for example, within nacelle 16, or elsewhere within an assembly housed within aircraft-engine assembly 14, wing 13, pylon 15, etc. The surrounding engine nacelle 16 has an air inlet. The air inlet includes an acoustic area within the nacelle in the form of an acoustic panel for reducing noise caused by high airflow through the air inlet into the aircraft-engine assembly 14.

FIG. 6A is an overhead plan view of a seamless, unitary acoustic panel 20 according to present aspects, with an exposed view of the seamless cellular-core section 28 comprising a plurality of seamless cells 30 that each comprise a seamless cell wall 32 defining a seamless cell chamber 33. According to present aspects, the characteristics of each seamless cell 30 can be altered, for example, during manufacture, to tailor cell variables in each cell individually, or among groups of cells, with the characteristics to be altered including, for example, material selection, material and cell-wall density, cell dimension, cell geometry, cell-chamber volume, and cell orientation, etc. According to present aspects, "groups" of seamless cellular-core cells, referred to equivalently herein as "seamless, cellular-core regions", can collectively comprise one or more cell characteristics, or cell variable "values".

That is, as shown in FIG. 6A the "bold" section of cells can represent a group of cells seamlessly manufactured to have shared or different characteristics from other adjacent cell groups, or adjacent cell "regions". As further shown in FIG. 6A, the "unboldened" cells 30 can occupy a seamless first cellular-core region 36 having seamless first cells 36*a* having seamless first cell walls 36*b*. According to present aspects, the seamless first cells 36*a* of seamless first cellular-core region 36 can each comprise a similar value of a seamless first cell characteristic that can be, for example, the presence of a selected material, a selected material density, a cell dimension, a cell-chamber volume, a cell geometry, a cell orientation, a cell-wall thickness, etc., and that can be "common" to the entire seamless first cellular-core region.

The "bold" cells 30 can occupy a seamless second cellular-core region 38 having seamless second cells 38*a* having seamless, second-cell walls 38*b*. According to present aspects, the seamless second cells 38*a* of seamless, second cellular-core region 38 can each comprise a similar value of a seamless, second-cell characteristic that can be, for example, the common presence of a selected material, a selected material density, a cell dimension, a cell-chamber volume, a cell geometry, a cell orientation, a cell-wall thickness, etc. According to present aspects, the characteristics of the seamless second cells 38*a* in the seamless, second-cell region 38 can be tailored to differ to a selected extent, degree, value, value range, etc., from one or more of the characteristics of the seamless, first-cells 36*a* in the seamless, first-cell region 36.

According to other present aspects, each of the seamless, first cellular-core region and seamless, second cellular-core region can comprise any selected number of individual cells, including one, two, three, four, five six or more cells, etc. FIG. 6B illustrates an overhead plan view of an individual "bold" cell 30 occupying a seamless, second cellular-core region 38 having a single seamless second cell 38*a*, or two adjacent seamless second cells 38*a* having seamless second cell walls 38*b* constituting a seamless, second cellular-core region 38, and surrounded by one or more "unboldened" cells 30 occupying a seamless first cellular-core region 36 as seamless first cells 36*a* having seamless first cell walls 36*b*. According to present aspects, the seamless second cells 38*a* of seamless, second cellular-core region 38 can each comprise a similar value of a seamless second cell characteristic that can be, for example, the presence of a selected material, a selected material density, a cell dimension, a cell-chamber volume, a cell geometry, a cell orientation, a cell-wall thickness, etc., and that can be "common" to the entire seamless, second cellular-core region.

Seamless first and second cellular-core "regions" refer to two "groups" of differing cell type, with each cell "group" having cells that have at least one differing characteristic from the cells of the other group. That is, as shown in the FIGS. 6A and 6B, the "non-bold" cells represent cells that belong to a seamless first cell group, or seamless first cellular-core "region" and the "bold" cells represent cells belonging to a seamless second cell group, or seamless second cellular core "region". The first and second cellular-core regions can be inhabited by a single cell type, or multiple cells of a similar cell type that are positioned adjacent to one another, and that constitute, according to present aspects, a different group from another group or individual cells of another cell type from another cellular-core region.

According to a present aspect, the seamless, integral cellular-core section 28 can comprise a selected number of seamless cellular-core regions beyond the two seamless cellular-core regions shown in FIGS. 6A, 6B. That is, according to present aspects, a seamless integral cellular-core section can have two, three, four, five, six, or more, differing seamless cellular-core regions to create a selected overall tailored acoustic effect in the seamless, unitary seamless acoustic panel to attenuate, cancel, alter, etc., one or more sound frequencies.

According to a present aspect, each differing seamless cellular-core region can be tailored to selectively, if desired, further tailor acoustic effect within the varying cellular regions in the unitary one-piece, seamless acoustic panel (e.g., to further attenuate, cancel, alter, etc., one or more sound frequencies to a varying or similar degree within a given seamless cellular-core region, etc.).

As shown in FIG. 6A, each of the two cell groups comprises multiple cells positioned adjacent to one another (e.g., within each group). As shown in FIG. 6B, the seamless second cellular-core region 38 ("bold" cells 38*a*) are shown as individual cells interspersed with cells 36*a* from the seamless, first cellular-core region 36, such that no two cells from the seamless, second cellular-core region groups are adjacent to one another. However, both FIGS. 6A and 6B represent the presence of first and second seamless cellular-core regions present in the seamless cellular-core section 28. Any number of cells from more than one cell group can be positioned adjacent to one another to achieve, for example, a selected acoustic-tailoring effect (e.g., sound-frequency attenuation, sound-frequency cancellation, sound-frequency alteration, of one or more sound frequencies, etc.)

According to present aspects, seamless, unitary acoustic panels, assemblies comprising the seamless, unitary acoustic panels, and methods of manufacturing seamless, unitary acoustic panels are presented. In addition, the presently disclosed seamless, unitary acoustic panels can be constructed to deliver a selected degree or amount of sound cancellation, sound attenuation, sound alteration, and/or sound redirection, etc., at least by altering, during manufacture, and in real time, one or more variables of various sections and/or cellular-core regions of the seamless, unitary acoustic panel.

In one present example, depending upon a selected end use, the present seamless, unitary acoustic panel section variables that can be selectively altered during manufacture include, for example, facesheet material (e.g., facesheet feedstock, etc.), cellular-core section material (e.g., cellular-core section feedstock, etc.), etc. By altering, during manufacture, a selected facesheet material and/or a selected cellular-core section material (and/or material composition), one or more facesheets, and one or more cellular-core sections can comprise a varying or differing density along the length, depth (e.g., "thickness"), area, etc., of a facesheet and/or cellular-core section being manufactured. In addition, present aspects contemplate varying the characteristics of each cell within the cellular-core section. Producing one or more facesheets and/or one or more cellular-core sections having, for example, a selected differing material density or physical dimension at various regions along the facesheet section and/or cellular-core section, and/or individual cells of the cellular-core section can provide heightened manufacturing flexibility in making a tailorable seamless acoustic panel product or tailorable standalone cellular core structure that will alter sound transmission (and cancel, attenuate, and/or redirect encountered selected sound frequencies, etc.) in a selected way such that the manufactured seamless acoustic sound panel as a unitarily manufactured product is effectively tailored, during manufacture, to have selected sound-attenuation characteristics that can match a desired end use.

In another present example, presently disclosed seamless, unitary acoustic panels can comprise one or more facesheets and/or one or more cellular-core sections, or individual cells in the cellular-core sections having, for example, a selected differing dimension, and/or geometry at various regions along the area of one or more facesheets and/or cellular-core section and/or individual cells. The selection of varying dimension and/or geometry at various regions along the area of one or more facesheets and/or cellular-core section and/or among individual cells can provide heightened flexibility, including manufacturing flexibility, in a seamless acoustic panel and cellular-core structure that will selectively alter sound transmission (and cancel, attenuate, and/or redirect encountered sound selected sound frequencies) in a selected way, such that the manufactured seamless acoustic sound panel and/or cellular-core structure, as a manufactured product, is effectively tailored, during manufacture, and in real time, to have a selected and tailored sound-attenuation characteristic that can match a desired end use.

In another present example, presently disclosed seamless, unitary acoustic panels can comprise one or more facesheets and/or one or more cellular-core sections having, for example, a selected differing relative orientation of the seamless acoustic panel section relative to one another, and/or relative to a larger assembly integrating such seamless acoustic panels. The selection of an introduced varying orientation (including, for example, altering an orientation of a seamless facesheet and/or one or more seamless cells in a seamless cellular-core section, e.g., from an initial planar orientation to a non-planar orientation, from a non-planar orientation to a planar orientation, etc.), at various regions along the length and/or area of one or more seamless facesheets and/or within a seamless cellular-core section (including, e.g., one or more cells within a seamless cellular-core section) can further provide heightened flexibility, and tailorability, including manufacturing flexibility, in a seamless, acoustic-panel product that will alter sound transmission (and cancel, attenuate, and/or redirect encountered sound selected sound frequencies) in a selected way, such that the manufactured seamless acoustic panel and/or cellular-core structure as a manufactured product is effectively tailored, during manufacture, to have a selected sound-attenuation characteristic that can match a desired end use.

According to present aspects, the seamless construction of the presently disclosed seamless, unitary acoustic panels can include, throughout the seamless sections of the seamless acoustic panels, varying material densities, varying dimensions, varying geometries, and varying spatial orientations of one or more seamless sections of the presently disclosed acoustic panels section relative to one another. According to present aspects, such variables (referred to equivalently herein as "manufacturing parameters" and/or manufactured characteristics) of the presently disclosed seamless, unitary acoustic panels are "tailored", during manufacture, and in real time, to alter and customize to a selected amount and/or selected degree, the values of the stated "variables" (e.g., material selection, density, dimension, geometry, and/or orientation, alone, or in combination) seamless acoustic sound panels are customized to deliver a selected amount and/or degree of sound alteration including, for example, selected sound attenuation, selected sound cancellation, selected sound redirection, etc., of selected sound frequencies.

FIGS. 7, 8A, 8B, 8C, 9A, 9B, 9C provide further enlarged illustrative detail of the seamless cells of the present seamless cellular-core structure and of the present seamless cellular-core section of the seamless, unitary acoustic panel, according to present aspects. FIG. 7 is a slightly elevated perspective view of an individual seamless cell 30, showing a seamless cell wall 32 in the shape of a hexagon and a seamless septum 34 in seamless communication with seamless cell wall 32, with the seamless cell wall 32 and the seamless septum 34 defining a majority of a seamless cell chamber having a seamless cell-chamber volume. According to a present aspect, and as shown in FIG. 7, seamless septum 34 can comprise a plurality of septum perforations **34*a*** that can be a selected pattern of a plurality of perforations extending through the septum, with such perforations formed into the septum during manufacture, and with no separate (e.g., subsequent) machining or processing step involved in the introduction of the septum perforations into the septum. According to a further aspect, the septum may not have perforations.

While a portion of the total cell volume can exist beneath the septum, in one example, the septum defines a boundary of the seamless cell chamber with the cell chamber and cell-chamber volume referred to herein as the area within the seamless cell wall and the area "above" the seamless septum, shown in FIG. 7 as "d1". As further shown in FIG. 7, seamless cell wall can have a thickness "t1" that, at least as shown in FIG. 7, can be a uniform thickness throughout the height of the seamless cell wall 32.

In addition, according to present aspects, a seamless cell wall (e.g., in the longitudinal configuration of a tubular hexagon) of the seamless cell can be tailored to have non-uniform cell-wall thicknesses in various integral cell-wall "sections" (as opposed to separate wall sections that would be separate cell walls in a typical construction where the cell walls were not seamless, for example). FIGS. 8A, 8B, and 8C are cross-sectional illustrations of seamless cell walls selected to have varying cell-wall thickness at and along one or more sections of the seamless cell wall.

As shown in FIG. 8A, seamless cell wall 32 of seamless cell 30 has a seamless cell-wall first thickness ("t1") and a seamless cell-wall second thickness ("t2") at different sections of seamless cell wall 32. The seamless cell wall 32 of seamless cell 30 shown in FIG. 8A is said to be non-uniform (e.g. "non-uniform" at least in terms of cell-wall thickness value along its length). As shown in FIGS. 8B and 8C, the seamless cell wall 32 of seamless cell 30 has a uniform thickness "t1" among the sections of the seamless cell wall 32. As shown in FIGS. 8B and 8C the seamless cell-wall thickness "t1" can be selected to be "thinner" (shown, e.g., in FIG. 8B) or "thicker" (shown, e.g., in FIG. 8C) for the purpose of tailoring the ability of an individual cell or groups) of seamless cells to attenuate, cancel, etc., one or more sound frequencies.

As shown in FIGS. 8A, 8B, 8C, wall sections of the seamless cell wall 32 are parallel to one another and the cell wall 32 is perpendicular to the facesheet(s). In addition, the septum is selectively positioned at a distance "d1" from the top of the cell-chamber wall. The location of the septum within the cell chamber can be selected to further tailor the sound attenuation of the individual cell, as well as the collective sound attenuation among a plurality of the cells within the cellular-core section of the sound-attenuation panel; giving the entire sound-attenuation panel a selected sound-attenuation capability. FIG. 8C shows a septum 34 positioned at a "height", "d2" within cell chamber 33 that can be different from the septum location "d1" within a cell, as shown in FIGS. 8A, 8B.

In addition, according to present aspects, a seamless cell wall (e.g., shown in the FIGs. in a longitudinal configuration of a tubular hexagon) of the seamless cell can be tailored to have, and can otherwise provide significantly enhanced sound-attenuation flexibility and capability by having non-uniform cell-wall thicknesses within the same cell-wall section along the height of one or more sections of the seamless cell wall.

FIGS. 9A, 9B, and 9C are cross-sectional illustrations of seamless cell walls of seamless cells selected to have varying cell-wall thickness at one or more sections (e.g., locations) of the seamless cell wall (e.g., a location along the length/height of the same cell-wall section, etc.), such that at least a portion of the cell wall along its length, and the cell chamber defined by the cell wall, will not be perpendicular to the septum within the chamber, and at least a portion of the cell wall and cell chamber will not be perpendicular to at least one facesheet. In another example, not shown in the FIGs., the orientation of the seamless septum also can be non-planar with respect to at least one facesheet, such that the septum is not perpendicular to at least one facesheet. As used herein, the term "perpendicular" means oriented at an angle of 90° to a given line, plane, or surface. As used herein, the term "non-perpendicular" or "not perpendicular" means oriented at an angle other than 90° to a given line, plane, or surface.

According to present aspects, the seamless cells can have a length ranging from about 0.4 mm to about 25 mm. In another example, the seamless cells can have a length ranging from about 0.8 mm to about 13 mm. In a further example, the seamless cells can have a length ranging from about 1.2 mm to about 6.4 mm. According to a further example, the seamless cell walls can have thicknesses ranging from about 0.01 mm to about 2 mm. In another example, the seamless cell walls can have thicknesses ranging from about 0.02 mm to about 1 mm. In another example, the seamless cell walls can have thicknesses ranging from about 0.02 mm to about 0.4 mm. According to present aspects, and as described herein, the seamless cell-wall thickness can be selected and tailored to intentionally vary long the length of the seamless cell wall, with the selected varying thicknesses achieved during manufacture.

As shown in FIG. 9A, seamless cell wall 32 of seamless cell 30 along the height of cell-wall section 32*a* has a plurality of seamless cell-wall first thicknesses that differ from one another (e.g., at least "t1", "t3"). Seamless cell wall 32 at seamless cell-wall section 32*b* has a plurality seamless cell-wall second thicknesses that differ from one another (e.g., "t2", "t4") at different heights of the respective seamless cell-wall section 32*b* of seamless cell wall 32. The seamless cell wall 32 and the seamless cell-wall sections 32*a*, 32*b* of seamless cell 30 shown in FIG. 9A are shown to be "non-uniform" along the length (e.g., the "height") of the seamless cell wall 32 and seamless cell-wall sections 32*a*, 32*b*. The non-uniformity (e.g., the varying thicknesses of "t1" as compared to "t3" along the height of cell-wall section 32*a*, and the varying thicknesses of "t2" as compared to "t4" along the height of cell-wall section 32*b*) selected for and introduced to a seamless cell wall 32 along seamless cell-wall sections 32*a*, 32*b* can be selected to tailor the ability of an individual seamless cell, or groups of seamless cells, to attenuate, cancel, and otherwise alter one or more selected sound frequencies.

Further, the selected amount of sound attenuation, sound cancellation, and sound altering of the seamless cells, individually and collectively as "groups of cells" in one or more seamless cellular-core region, can further tailor the impact of the sound-frequency cancelling, sound-frequency attenuation, sound-frequency redirection (including, e.g., sound-frequency reflection, etc.) and sound-frequency-altering capability (for one or more selected sound frequencies, etc.) of the seamless cellular-core comprising the seamless cell and/or seamless cellular core regions, and the seamless, unitary acoustic panel comprising the seamless cellular-core section.

As shown in FIGS. 9B and 9C, the seamless cell wall 32 of seamless cell 30 has a non-uniform thickness among and within and along the length/height of seamless cell-wall first section 32*a* and seamless cell-wall second section 32*b* of the seamless cell wall 32. As shown in FIGS. 9B and 9C the seamless cell-wall thickness can be selected to have "thinner" or "thicker" thicknesses along the length (e.g., height) of sections of cell wall 32, at least for the purpose of selecting a tailored effect/ability to attenuate, cancel, alter, etc. one or more selected sound frequencies within an individual cell or group of seamless cells.

Present aspects, for the first time, facilitate significant acoustic flexibility by providing tailored aircraft acoustic-panel sound-frequency attenuation/alteration solutions to aircraft assemblies by affording the possibility of selecting varying dimensional, geometric, material density, and other variable configurations into the presently disclosed seamless, unitary acoustic panels, and seamless cellular-core structures.

In addition, the relative linear and non-linear orientation of a portion of, or of an entire seamless cell chamber and cell wall (e.g., by altering cell-wall thicknesses along their length to create a selected cell-chamber dimension, selected cell-chamber volume, etc.) further affords additional significant selected sound-tailoring to the cell, a collection of cells, cell regions, and the entire seamless, unitary acoustic panel. For example, present aspects contemplate (relative to a facesheet, for example) selectively orienting, in a non-perpendicular orientation, individual cells (and/or portions of induvial cells), groups of cells (and/or portions of groups of cells), patterns of individual cells or patterns of groups of cells (or portions of patterns of individual or groups of cells), etc., during the manufacture of the seamless cellular-core.

That is, according to present aspects, and as shown at least in FIGS. 9A, 9B, and 9C, selected dimensional variations in seamless cell-wall sections or cell-wall segments (locations at various lengths, etc.) of seamless cell walls can be manufactured into the seamless cellular core of the seamless, unitary acoustic panel to deliver a selected sound-altering capability to the acoustic panel for one or more selected frequencies. Accordingly, the intentional non-perpendicular orientation of cell-wall sections and/or cell-wall segments (relative to, for example, one or more facesheet) can cause a selected "curving" or "bending" of the cell walls (and/or the cell-wall chamber) that bound and otherwise define a cell-wall chamber, at least internally, and that can create a selected and tailored cell-chamber volume, for example.

As shown in FIGS. 9A, 9B, and 9C, the varying of the thicknesses of cell-wall sections, for example, during a unitary and seamless manufacture of the cellular core along cell-wall section lengths can enable a cell chamber to "curve" or "bend", or to otherwise have a selected chamber contour, regular or irregular geometry, uniform or non-uniform geometry, etc., such that the chamber bends, arcs, or is otherwise oriented to bend toward and/or bend away from cell-wall sections in a selected fashion. As shown in 9C, the chamber can be fabricated and selected to change direction toward and away from a cell-wall section more than once within and/or along a particular cell-chamber length/height.

Aspects of the present disclosure find use in a variety of potential applications, particularly in the transportation industry including, for example, aerospace, marine, automotive applications and other application where acoustic panels can be employed and are desired. Thus, referring now to FIGS. 10 and 11, aspects of the disclosure may be used in the context of an aircraft manufacturing and service method 500 and aircraft 600 including at least in the component and subassembly manufacturing 506, system integration 508, maintenance and service 514, in the assembly and maintenance of the aircraft airframe 602, and through aircraft interior 604.

Aircraft applications of the disclosed aspects may include, for example, and without limitation, acoustic areas around engines, such as engine nacelles, thrust reversers, etc., and areas within the aircraft that are in communication with airflow, including sound-generating airflow areas, etc. During pre-production, exemplary method 500 as shown in FIG. 10 includes specification and design 502 of the aircraft 600 and material procurement 504. During production, component and subassembly manufacturing 506 and system integration 508 of the aircraft 600 takes place. Thereafter, the aircraft 600 may go through certification and delivery 510 in order to be placed in service 512. While in service by a customer, the aircraft 600 is scheduled for routine inspection, maintenance, and service 514, which may also include modification, reconfiguration, refurbishment, and so on.

Each of the processes of method 500 can be performed or carried out by a system integrator, a third party, and/or an operator (e.g., a customer). For the purposes of this description, a system integrator may include, without limitation, any number of aircraft manufacturers and major-system subcontractors. Further, a third party may include, without limitation, any number of vendors, subcontractors, and suppliers; and an operator may be an airline, leasing company, military entity, service organization, and so on.

As shown in FIG. 11, the aircraft 600 produced by exemplary method 500 can include an airframe 602 with a plurality of systems 603 and an interior 604. Examples of high-level systems 603 include, without limitation, one or more of a propulsion system 604, an electrical system 608, a hydraulic system 610, and an environmental system 612. Any number of other systems can be included. Although an aerospace example is shown, aspects of the present disclosure may be applied to other industries, such as the marine and automotive industries.

Systems and methods embodied herein may be employed during any one or more of the stages of the production and service method 500. For example, components or subassemblies corresponding to production process 506 may be fabricated or manufactured in a manner similar to components or subassemblies produced while the aircraft 600 is in service. Also, one or more apparatuses, methods, or a combination thereof may be used during the production stages 506 and 508, for example, by substantially expediting assembly of or reducing the cost of an aircraft 600. Similarly, one or more of apparatus embodiments, method embodiments, or a combination thereof may be utilized while the aircraft 600 is in service, for example and without limitation, to inspection, maintenance, and service 514 the aircraft 600.

As with the seamless cell wall of the seamless cells of the seamless cellular-core section described herein, according to present aspects, the seamless facesheets between which the seamless cellular-core section is sandwiched can have a selected uniform thickness across the area of the facesheets. In further aspects, the facesheets between which the seamless cellular-core section is sandwiched can have a selected non-uniform thickness across the area of the seamless facesheets that can vary in selected thicknesses. Still further, according to present aspects, the spatial geometry (e.g., the dimension, etc.) of one or both of the seamless facesheets, alone or in combination with the spatial geometry (e.g., dimension) of the seamless cellular-core section can achieve a selected overall dimension and geometry for the seamless, unitary acoustic panel.

In addition, as described herein, at least through material selection during manufacture, the seamless facesheets can be further acoustically tailored by comprising more than one selected density at various locations of the seamless facesheet; and one seamless facesheet can be constructed to have a first density through its thickness and along its area, with a second seamless facesheet configured to have a second density through its thickness and along its area. In addition, each of two seamless facesheets in the seamless, unitary acoustic panel construction each can be tailored, in real time, during manufacture to each comprise seamless facesheet regions having differing thicknesses, differing densities, differing geometric regions, regions of differing angularity (e.g., both planar sections/regions and non-planar sections/regions), etc.

According to present aspects, the ability to tailor the sound alteration of the present seamless, unitary acoustic panel, as well as the ability to manufacture the present seamless, unitary acoustic sound panel having a selected overall geometry, yields significant advantages over typical sound-altering panels that typically comprise the assembly of discrete parts and components and are not seamless or unitary, or comprise only the assembly of discrete pieces, including assembly in separate assembly stages. For example, the presently disclosed seamless, unitary acoustic panel can be produced in a selectively tailored fashion to not only selectively tailor sound-frequency alteration, but can also be produced in a dimensionally-tailored selected fashion to match or otherwise accommodate an "end-use" dimension, such that the produced seamless, unitary acoustic panel can be selectively dimensioned into a selected end-use shape, dimension, etc., including, for example, a non-planar shape that can include, for example, a contoured shape that can include a selected curve or curvature that can further include a circular shape, an elliptical shape, a regular shape or dimension, an irregular shape or dimension, etc.

The ability to selectively dimension the presently disclosed seamless, unitary acoustic panel to match, complement, or otherwise accommodate the contour, shape, dimension, etc., of the selected end-use provides a myriad of further presently contemplated advantages (as compared to the typical manufacture of acoustic panels that are not seamless and that are not unitary in construction, and are instead made from a significant number of separate parts that must be joined) including, for example: reducing separate part inventory; reducing overall acoustic-panel weight; reducing the overall weight of the structure and/or assembly comprising the present seamless, unitary acoustic panel; increasing acoustic performance flexibility of the seamless, unitary acoustic panel that can be tailored to deliver a selected sound-frequency alteration of one or more frequencies; increasing repeatable and narrowly defined sound-frequency alteration due to the elimination of discrete acoustic panel components having and requiring seams, adhesives, welds, etc.; reducing processing time and reducing cost for the fabrication of the presently disclosed seamless, unitary acoustic panel (due to, for example an elimination in manufacturing steps, elimination of inventory, etc.); etc.

In addition, according to present aspects, the presently disclosed seamless, unitary acoustic panel can be produced to incorporate an overall configuration that can be planar along the length and/or the width of the entire acoustic panel. In another example, a presently disclosed seamless, unitary acoustic panel can be produced to incorporate an overall configuration that can be non-planar along the length and/or the width of the entire seamless, unitary acoustic panel. According to present aspects, this can be accomplished, for example, by producing one or more seamless, unitary acoustic panels having an arcuate (e.g., a non-linear or non-planar) seamless, integral cellular-core section.

Present aspects further contemplate seamless facesheets seamlessly incorporated into the seamless, unitary acoustic panel construction with, for example, an arcuate, seamless, integral cellular-core section. In such an orientation, the seamless facesheets can have a uniform thickness across their area, with the arcuate, seamless, integral cellular-core section "responsible for" or otherwise dimensioned to provide the arcuate shape of the finished acoustic panel, such as, for example, by having a selected dimensional change (e.g., a thickness change, etc.) along the length of the seamless, integral, cellular-core section.

In addition, present aspects further contemplate non-planar, seamless, unitary seamless acoustic panels comprising planar and/or non-planar seamless, integral cellular-core sections sandwiched between the two seamless, integral facesheets, with the one or more of the two seamless, integral facesheets comprising a uniform or non-uniform seamless facesheet thickness across the area of the seamless, integral facesheet. That is, according to present aspects, a seamless, unitary acoustic panel construction having a non-planar panel configuration can be achieved by incorporating seamless, integral facesheets having a non-uniform thickness across the area of the facesheet in combination with an arcuate or a non-arcuate seamless, integral, cellular-core section.

To illustrate further aspects of manufacturing and performance flexibility, tailorability, and advantages of the presently disclosed seamless, unitary acoustic panels, FIGS. 12A, 12B, 12C, 12D are enlarged cross-sectional side view representative illustrations of at least one seamless, integral facesheet of the present seamless, unitary acoustic panel having a uniform or non-uniform thickness that can be selected to contribute to the ability to produce a tailored and selected dimension in the finished seamless, unitary acoustic panel.

As shown in FIG. 12A, a seamless, unitary acoustic panel 20 comprises a seamless, integral cellular-core section 28 comprising seamless cells 30. The seamless, integral cellular-core section 28 comprising seamless cells 30 is positioned seamlessly between seamless first facesheet 22 (shown in a planar configuration) and seamless second facesheet 24 (shown in a non-planar configuration).

As shown in FIG. 12A, a thickness "fs-t1" of seamless, integral first facesheet 22 and a thickness "fs-t1" of the seamless, integral second facesheet 24 "fs-t1" are substantially equivalent and are further substantially constant in thickness across the length and width (e.g., across the "area" of the two facesheets 22, 24. As shown in FIG. 12A, the side of the seamless, integral cellular-core section 28 closest to the seamless, integral second facesheet 24 is arcuately configured (e.g., in a non-planar configuration). Accordingly, as shown in FIG. 12A, the seamless, integral second facesheet 24 is also arcuate in form and/or geometric "dimension" to complement the arc of the side of the seamless, integral cellular-core section 28 closest to the seamless, integral second facesheet 24.

FIG. 12B shows an enlarged cross-sectional side view of an alternate aspect of a seamless, unitary acoustic panel 20 with the seamless, integral, cellular-core section 28 comprising seamless cells 30 in a non-planar configuration, with the cellular-core section 28 further positioned seamlessly between seamless, integral first facesheet 22 (having a non-planar configuration) and seamless, integral second facesheet 24 (also having a non-planar configuration). That is, as shown in FIG. 12B, the side of the seamless, integral, cellular-core section 28 closest to the seamless, integral second facesheet 24 and the side of the seamless, integral cellular-core section 28 closest to the seamless, integral first facesheet 22 both have an arcuate configuration, and both first and second seamless facesheets 22, 24 each have a substantially constant thickness, "fs-t1", across their areas.

Accordingly, as shown in FIG. 12B, both sides of the seamless, integral cellular core-section 28 and both the first and second seamless, integral facesheets 22, 24 have a non-planar and arcuate configuration, such that the resulting seamless, unitary acoustic panel 20 shown in FIG. 12B can be manufactured into a seamless, non-planar configuration, for example, as a segment of a circle, ellipse, etc., or into a geometric configuration that can include, for example, a completed contoured/curved shape that can be in a single panel, for example, a completed circle, completed ellipse, etc. Such a curved, or circular, or elliptical, etc., final configuration for the present seamless, unitary acoustic panel can be advantageous when such a seamless, unitary, non-planar, curved panel is incorporated as a seamless, unitary, one-piece acoustic panel into, for example, an aircraft nacelle or other curved aircraft-engine assembly, or other aircraft assembly etc. See, e.g., FIG. 12E. Again, as shown in FIGS. 12A and 12B, the thickness of the first and second seamless facesheets 22, 24 have a substantially constant thickness across the area of both facesheets.

FIGS. 12C and 12D are enlarged cross-sectional side views showing alternate aspects of a seamless, unitary acoustic panel 20 where the seamless, integral first and second facesheets 22, 24 do not have a uniform thickness across the area of the respective facesheet. As shown in FIG. 12C, the seamless, cellular-core section 28 comprising seamless cells 30 is positioned between seamless, integral first facesheet 22 (with facesheet 22 comprising a planar configuration across its area) and seamless, integral second facesheet 24 (with facesheet 24 comprising a non-planar configuration across its area). Both sides of the seamless cellular-core section 28 are parallel to one another, and are shown as being "planar". As shown in FIG. 12C, the seamless, integral first facesheet 22 has a substantially constant thickness "fs-t1" across its area and further has a planar configuration across its area. FIG. 12C also shows seamless, integral, second facesheet 24 having a non-uniform thickness along its area. As shown in FIG. 12C, seamless, integral, second facesheet 24 has a "thinner" thickness, "fs-t1" toward the middle of the second facesheet 24 and a "thicker" thickness, "fs-t2" (that is greater than thickness "fs-t1"), toward either end of the second facesheet 24.

In another alternate aspect, FIG. 12D shows an enlarged cross-sectional side view of an alternate aspect of a seamless, unitary acoustic panel 20 with the seamless, integral cellular-core section 28 comprising seamless cells 30, and with the cellular-core section 28 positioned seamlessly between seamless, integral first facesheet 22 (in a non-planar configuration) and seamless, integral second facesheet 24 (also in a non-planar configuration), with the side of the seamless, integral, cellular-core section 28 closest to the seamless, integral second facesheet 24 and the side of the seamless, integral, cellular-core section 28 closest to the seamless, integral first facesheet 22 both having an arcuate (e.g., non-planar) configuration, and with the seamless facesheet 22 having a substantially constant thickness, "fs-t1", across its areas. As further shown in FIG. 12D, seamless, integral second facesheet 24 has a non-uniform thickness along its area, with seamless, integral second facesheet 24 having a "thinner" thickness, "fs-t1" toward the middle of seamless, integral second facesheet 24 and a "thicker" thickness, "fs-t2" (that is greater than thickness "fs-t1"), toward either end of the seamless, integral second facesheet 24. As shown in FIGS. 12C and 12D, the thickness of seamless, integral second facesheet 24 does not have a substantially constant thickness across its area.

As shown in FIGS. 12B and 12D, the non-planarity of the resulting seamless, unitary acoustic panels 20 can be made to obtain a curved, or circular, or elliptical, etc., final configuration for the present seamless acoustic panels, and can be advantageous when such a seamless, unitary, non-planar, curved panel is incorporated into, for example, the nacelle or other curved aircraft-engine assemblies, or other aircraft assemblies, etc.

Whereas, FIGS. 12B and 12D show a segment of the entire seamless acoustic panel according to present aspects, and that can be made according to present aspects, FIG. 12E is a cross-sectional view of an entire arcuate, unitary, one-piece, seamless acoustic panel. As shown in FIG. 12E, the entirety of a seamless, unitary acoustic panel 120 is shown having an arcuate and substantially circular configuration. As shown in FIG. 12E, the seamless, integral cellular-core section 128 comprises seamless cells 130, and is positioned seamlessly between seamless, integral first facesheet 122 (in a non-planar configuration) and seamless, integral second facesheet 124 (also in a non-planar configuration), with the side of the seamless, integral cellular-core section 128 closest to the seamless, integral second facesheet 124 and the side of the seamless, integral cellular-core section 128 closest to the seamless, integral first facesheet 122 both having an arcuate (e.g., non-planar) configuration. Such a curved, or circular, or elliptical, etc., final configuration for the present seamless acoustic panels can be advantageous when such a seamless, unitary, non-planar, curved panel is incorporated into, for example, the nacelle of other curved aircraft-engine assemblies, or other aircraft assemblies, etc.

The individual cells that are seamlessly produced in the cellular-core section of the presently disclosed acoustic panels can also be manufactured into a seamless, unitary cellular structure that does not comprise the integral facesheets. According to present aspects, the seamless, unitary cellular-core can itself find a selected end use (e.g., without the integral associated facesheets, for example) and cellular-core structure can comprise seamless cells of the type non-exhaustively shown at least in FIGS. 2, 3A, 3B, 4A, 4B, 6A, 6B, 7, 8A, 8B, 8C, 9A, 9B, 9C, 12A, 12B, 12C, 12D, 12E, and can be made according to presently disclosed methods, including using a large-area 3-D printer in combination with associated programmable hardware, software, etc. to run the large-area 3-D printer to additively manufacture the seamless, unitary cellular-core structure and the seamless, unitary acoustic panels that can incorporate the cellular-core section seamlessly.

The seamless, unitary acoustic panels disclosed herein can be considerably large, with the acoustic panel comprising an area of more than several hundred square feet or more (e.g., when such seamless panels are configured for use in, for example, an aircraft-engine assembly, or other aircraft assembly, etc.). Accordingly, to make the presently disclosed seamless, unitary acoustic panel, in one example, a present aspect contemplates the use of a programmable material-deposition machine that can accept, for example, one or more material feedstocks delivered to the material-deposition machine, and with the material-deposition machine configured to blend or "dope" one or more feedstocks, curtail, or cease acceptance of one or more feedstocks, and/or otherwise alter at least one feedstock flow rate to tailor a selected feedstock composition, for example, in real time.

Present aspects, further contemplate configuring an additive-manufacturing machine/3-D printer that can be programmable, in communication with accompanying controller(s), hardware, software, computers, etc., and that can be in communication with one or more feedstock materials, and that can convert, blend, alter, dope, etc. the one or more feedstock materials into a deposition material having selected deposition-material properties that can be tailored and adjusted, in real time, and then be deposited as a selected deposition material that is configured to form the presently disclosed seamless, unitary acoustic panel comprising the selected deposition-material properties that can be selected to deliver selected acoustic properties to the formed seamless, unitary acoustic panel.

The presently disclosed seamless, unitary acoustic panel that can be used with and otherwise integrated into large aircraft assemblies including, for example, aircraft-engine assemblies can be made from materials that can be introduced to and deposited from material deposition machines (including, for example, from an additive manufacturing large area 3-D printer) that can deposit and otherwise deliver a feedstock material from a feedstock to build-up a seamless, unitary acoustic panel. The presently disclosed seamless, unitary, acoustic panel can comprise, alone or in combination, a metal (e.g., aluminum, aluminum alloys, titanium, titanium alloys, steel alloys, etc.), a ceramic material, a fiber-and-resin-based composite material (e.g. fiberglass, carbon-fiber-containing composites, aramid-fiber-containing materials, boron-fiber-containing materials, etc.) etc. While weight can be a significant concern for aircraft-engine acoustic panels incorporated into aircraft-engine assemblies (e.g., in nacelles, thrust reversers, etc.), and high-strength/lower-density materials can be theoretically advantageous, present aspects also contemplate the manufacture of the disclosed seamless, unitary seamless acoustic panels comprising high-temperature-resistant metals such as, for example, aluminum, aluminum alloys, titanium, titanium alloys, steel alloys, etc.

Such material-deposition machines capable of manufacturing the presently disclosed acoustic panels can include, for example and without limitation, additive-manufacturing machinery including, for example, Laser Power Bed Infusion (L-PNF) machines, Electron Beam Melting (EBM) machines. While the expense of employing certain material-deposition modalities (including additive-manufacturing systems for metal deposition, etc.) can make their use technically impractical and strongly economically disfavored for large-component manufacturing (e.g., making use of the technology/machinery improbable and financially cost prohibitive, etc.), according to present aspects, emerging technologies in the field of large-area, additive-manufacturing deposition and large-area 3-D printing machinery can be used to produce the presently disclosed seamless, unitary acoustic panels comprising greatly enhanced and repeatable acoustic tailorability.

Present aspects contemplate manufacturing seamless, unitary aircraft-acoustic panels using large-area 3-D material-depositions machines that can be programmed to accurately and repeatably produce the presently disclosed seamless, one-piece aircraft acoustic panels with highly accurate, repeatable tolerances that are fabricated to yield a selected, accurate, and repeatable sound-attenuation performance without allowing typical manufacturing variables (during typical manufacture) to influence, diminish, or deviate from an ideal selected sound-frequency attenuation.

The presently disclosed seamless, unitary acoustic panels, and presently disclosed methods for their manufacture, obviate the need for large numbers of specialty tooling, molds, mandrels, etc., as well as the need to inventory the various expensive custom tooling and the need to inventory a large number of tooled separate parts that need to be joined in separate processing steps to make multi-part acoustic panels with honeycomb cellular-core segments, for example.

In addition, the seamless, unitary acoustic panels disclosed herein further obviate the need to machine, separately, panel features including, for example, the separate creation of perforations in seamless cellular septums and seamless facesheets. That is, according to present aspects, facesheets and septums can be formed by programmable deposition machines and methods to form perforations in the septums and facesheets, in real time, as the septums and facesheets are being created (e.g., obviating the need to separately "drill out" or otherwise separately machine a selected pattern of perforations, etc.).

According to present aspects, FIGS. 13 and 14 are flowcharts outlining presently disclosed methods useful for the production of the presently disclosed seamless, unitary acoustic panels. As shown in FIG. 13, a method for tailoring/attenuating sound in an aircraft assembly is disclosed with the method 100 including providing 102 an aircraft assembly, and integrating 104 into the aircraft assembly a seamless, unitary acoustic panel, with the seamless, unitary acoustic panel comprising a seamless, integral first facesheet, and a seamless, integral second facesheet, with at least one of the seamless, integral first facesheet and the seamless, integral second facesheet comprising a plurality of perforations that can be, for example, a pattern of perforations or a plurality of patterns of perforations extending through the at least one of the seamless, integral first facesheet and the seamless, integral second facesheet. According to present aspects, the method further comprises, during manufacture of the seamless, unitary acoustic panel, forming perforations or patterns of perforations into at least one of the seamless, integral first facesheet and the seamless, integral second facesheet, with no separate mechanical step required to form such perforations (e.g., no separate drilling step, punching step, etc.).

The seamless, unitary acoustic panel further comprises a seamless, integral cellular-core section seamlessly interposed between the seamless, integral first facesheet and the seamless, integral second facesheet, with the seamless, integral cellular-core section comprising a plurality of seamless cells, with the plurality of seamless cells comprising a plurality of seamless cell walls, and wherein at least one of the plurality of seamless cells further comprises differing cell properties from at least one of a remainder of the plurality of seamless cells, with the differing cell properties comprising at least one of differing cell-chamber volume, differing cell-wall thickness, differing cell-wall density, and differing cell sound-attenuation ranges for one or more sound frequencies, etc.

As shown in FIG. 14, a method for making a seamless, one-piece, unitary acoustic panel is disclosed and outlined, with the method 200 comprising directing 202 a selected amount of a tailorable first feedstock material to a material-deposition machine to form a tailorable first facesheet material and depositing 202 a selected amount of the tailorable first facesheet material from the material-deposition machine to a base to form a seamless, integral first facesheet. Method 200 further comprises directing 206 a selected amount of a tailorable second feedstock material to a material-deposition machine to form a tailorable, seamless, integral cellular-core material and depositing 208 a selected amount of the tailorable, seamless, integral cellular-core material from the material-deposition machine to the seamless, integral first facesheet to form a seamless, integral cellular-core section incorporated into the seamless, integral first facesheet. Method 200 further comprises directing 210 a selected amount of a tailorable third feedstock material to a material-deposition machine to form a second facesheet material, and depositing 212 a selected amount of the second facesheet material from the material-deposition machine to the seamless, integral cellular-core section to form a seamless, integral second facesheet incorporated into the seamless, integral cellular-core section, wherein the second facesheet material is deposited onto the seamless, integral cellular-core section to form a plurality of perforations in the seamless, integral second facesheet, with the perforations formed into the seamless, integral second facesheet during deposition of the second facesheet material, and wherein the seamless, integral first facesheet, the seamless, integral cellular-core section and the seamless, integral second facesheet are deposited to form the seamless, unitary acoustic panel. According to present aspects, the method further comprises, during manufacture of the seamless, unitary acoustic panel, forming perforations or patterns of perforations into at least one of the seamless, integral first facesheet and the seamless, integral second facesheet, with no separate mechanical step required to form such perforations (e.g., no separate drilling step, punching step, etc.).

According to present aspects, FIGS. 15 and 16 are flowcharts outlining presently disclosed methods useful for the production of the presently disclosed seamless, unitary cellular-core structure disclosed herein. As shown in FIG. 15, a method 700 for making a seamless, unitary cellular-core structure is disclose and outlined, with the method including directing 702 a selected amount of a tailorable first feedstock material to a material-deposition machine to form a first cellular-core material comprising a first density, depositing 704 a selected amount of the first cellular-core material from the material-deposition machine, and forming (706) a seamless, unitary cellular-core structure having a plurality of seamless cells, with the plurality of seamless cells including a plurality of seamless cell walls.

As shown in FIG. 16, a method 800 for making a seamless, unitary cellular-core structure is disclose and outlined, with the method including directing 702 a selected amount of a tailorable first feedstock material to a material-deposition machine to form a first cellular-core material comprising a first density, depositing 704 a selected amount of the first cellular-core material from the material-deposition machine, doping 802, in real time at least a portion of the selected amount of the tailorable first cellular-core material with a second feedstock material to change a characteristic of the tailorable first feedstock material and to form a second cellular-core material, with the second cellular-core material comprising a second density, and with the second density differing from the first density. Method 800 further includes depositing 804 a selected amount of the second cellular-core material from the material-deposition machine, and forming 706 at least a portion of the seamless, unitary cellular-core structure, with the seamless, unitary cellular-core structure having a plurality of seamless cells, with the seamless cells including a plurality of seamless cell walls, with at least one of the plurality of seamless cell walls having the first density and wherein at least one of the plurality of seamless cell walls having the second density.

The methods outlined in FIGS. 13, 14, 15, and 16 are understood to incorporate the seamless, unitary acoustic panels and cellular-core structures of the type described herein and at least shown in FIGS. 2, 3A, 3B, 4A, 4B, 6A, 6B, 7, 8A-8C, 9A-9C, 12A, 12B, 12C, 12D, 12E, and that can be further incorporated into aircraft and aircraft assemblies shown at least in FIGS. 1, 5, 10, and 11.

According to presently disclosed methods, desired and selected acoustic properties can be manufactured into the present seamless, unitary acoustic panels by selecting a first feedstock material (e.g., a first feedstock material delivered to an additive-manufacturing/material-deposition machine, etc.), and then changing a first feedstock material (e.g., doping a first feedstock material to create a second feedstock material, substituting a first feedstock material for a second different feedstock material, etc.) to vary the properties (e.g., density, cellular-wall orientation, cellular-wall dimension, facesheet dimension/thickness, facesheet planarity/non-planarity, etc.) of material deposited from material-deposition machine to form the unitary, one-piece, seamless acoustic panel.

In one example, depending on the desired and selected acoustic-attenuation properties for a seamless acoustic panel, and according to present aspects, a programmable large-area 3-D printer can be used to deposit an amount material from one or more metal feedstocks to form a first facesheet or a portion of a first facesheet. The feedstock materials supplying the large-area 3-D printer can be adjusted and altered in real time to produce a deposition material that is then used to form a seamless cellular-core section directly and integrally to the first facesheet. As feedstock material is adjusted/changed, in real time, the integrally-deposited cellular-core section can have a density that is the same or different than the first facesheet. In addition, as the seamless cellular-core section is deposited, the physical characteristics of each cell in the cellular core can be tailored with selected precision to obtain a cellular core with selected differences among the individual cells in the cellular core that can include, for example, cell geometry, cell-wall thickness, cell-wall density, cell-chamber volume, cell orientation and/or cell-chamber orientation (e.g., cell-wall and/or cell-chamber deviation from a perpendicular orientation relative to one or more facesheets, etc.). A selected feedstock material can then be supplied to the deposited cellular-core section to form an integral, seamless second facesheet into the cellular-core section.

The term "substantially" as used herein means that a particular characteristic, parameter, or value does not need to be exactly achieved. Rather, deviations or variations, including, for example, tolerances, measurement error, measurement accuracy limitations, and other factors known to those skilled in the field, may occur in amounts that do not preclude the effect that the characteristic was intended to provide.

The term "real time": refers to a short period of time, typically a duration of time ranging from about 0.1 to about 1 second, and more preferably from about 0.25 to about 0.5 seconds.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. An apparatus for attenuating sound in an aircraft assembly, the apparatus comprising:

a seamless unitary acoustic panel assembly comprising:

a seamless, integral first facesheet;

a seamless, integral second facesheet, at least one of said seamless, integral first facesheet and said seamless, integral second facesheet comprising a plurality of integral perforations extending through said at least one of said seamless, integral first facesheet and said seamless, integral second facesheet, said integral perforations formed into the at least one of said seamless, integral first facesheet and said seamless, integral second facesheet during manufacture of the at least one of said seamless, integral first facesheet and said seamless, integral second facesheet, said plurality of perforations combining to comprise a total open area of the at least one of said seamless, integral first facesheet and said seamless, integral second facesheet ranging from about 4% to about 14%;

a seamless, integral cellular-core section seamlessly interposed between said seamless, integral first facesheet and said seamless, integral second facesheet, said seamless, integral cellular-core section comprising a plurality of seamless cells, said plurality of seamless cells each comprising a plurality of seamless cell walls, at least one of said plurality of seamless cell walls comprising a cell wall length, said at least one of said seamless cell walls comprising a manufactured varying cell wall thickness along the cell wall length to intentionally form in real time a non-uniform seamless cell wall thickness along the cell wall length of the at least one of the plurality of seamless cell walls, said plurality of seamless cell walls defining a seamless cell chamber in each of said plurality of seamless cells, said seamless cell chamber comprising a selected chamber contour, said selected chamber contour comprising a curving irregular geometry, said seamless cell chamber comprising a selected and tailored seamless cell-chamber volume;

wherein said seamless cell chamber further comprises a selected internal cell chamber contour, said selected internal cell chamber contour comprising an internal cell chamber contour geometry, said internal cell chamber contour geometry configured to form a selected internal cell chamber contour curved bend, said internal cell chamber contour curved bend oriented to change direction toward and away from a cell-wall section more than once within and along an at least one seamless cell chamber length; and wherein the plurality of seamless cell walls defining the seamless cell chamber further comprise a non-linear orientation of an entire seamless cell chamber along the entirety of the at least one seamless cell chamber length.

2. The apparatus of claim 1, wherein at least one of said plurality of seamless cells comprises a seamless septum, said seamless septum positioned seamlessly within the at least one of said plurality of seamless cells, said seamless septum positioned seamlessly at a first selected depth within the seamless cell chamber of at least one of said plurality of seamless cells, said seamless septum integrally formed with the plurality of seamless cell walls.

3. The apparatus of claim 2, wherein said seamless septum is positioned seamlessly at a first selected depth within a first seamless cell chamber, said second seamless cell comprises a seamless septum positioned seamlessly at a second selected depth within a second seamless cell chamber, wherein the first selected depth differs from the second selected depth, said seamless septum integrally formed with the seamless cell wall.

4. The apparatus of claim 1, wherein said seamless cell wall comprises a seamless cell-wall first section and a seamless cell-wall second section, and wherein at least one of said seamless cell-wall first section, said seamless cell-wall second section, and said seamless cell chamber is configured to be non-perpendicular to at least one of said seamless, integral first facesheet and said seamless, integral second facesheet along the length of the at least one of said seamless cell-wall first section, said seamless cell-wall second section, and said seamless cell chamber.

5. The apparatus of claim 4, wherein the at least one of said seamless cell-wall first section and said seamless cell-wall second section has a selected seamless cell-wall thickness that is non-uniform along its length.

6. The apparatus of claim 1, wherein more than one of said at least one of the plurality of seamless cell walls comprises a selected non-uniform thickness along its length.

7. The apparatus of claim 1, wherein at least one of said seamless, integral first facesheet and said seamless, integral second facesheet comprises a selected non-uniform thickness along its area.

8. The apparatus of claim 1, wherein at least one of the seamless, integral first facesheet and the seamless, integral second facesheet comprises a non-uniform density along its area.

9. An object comprising the apparatus of claim 1.

10. An aircraft-engine assembly comprising the apparatus of claim 1.

11. An aircraft comprising the apparatus of claim 1.

12. The apparatus of claim 1, wherein said seamless, integral cellular-core section comprises:

a seamless first cellular-core region, said seamless first cellular-core region comprising a plurality of seamless first cells comprising a plurality of seamless first cell walls defining a seamless first cell chamber, said seamless first cell chamber having a selected seamless first cell-chamber volume, at least one of said plurality of seamless first cell walls comprising a selected seamless first cell-wall thickness, said at least one of said plurality of seamless first cell walls further comprising a selected first cell-wall density; and a seamless second cellular core region, said seamless second cellular-core region comprising a plurality of seamless second cells comprising a plurality of seamless second cell walls defining a seamless second cell chamber having a selected seamless second cell-chamber volume, at least one of the plurality of seamless second cell walls comprising a selected seamless second cell-wall thickness, said at least one of said plurality of seamless second cell walls further comprising a selected second cell-wall density, said seamless second cellular-core region positioned adjacent the seamless first cellular-core region.

13. The apparatus of claim 12, wherein at least a portion of the at least one of said plurality of seamless first cell walls is oriented perpendicular to at least one of the seamless, integral first facesheet and the seamless, integral second facesheet.

14. The apparatus of claim 12, wherein at least a portion of the at least one of said plurality of seamless second cell walls is oriented perpendicular to at least one of the seamless, integral first facesheet and the seamless, integral second facesheet.

15. The apparatus of claim 12, wherein at least a portion of the at least one of the plurality of seamless first cell walls is oriented non-perpendicular to at least one of the seamless, integral first facesheet, and the seamless, integral second facesheet.

16. The apparatus of claim 12, wherein at least a portion of the at least one of said plurality of seamless second cell walls is oriented non-perpendicular to at least one of the seamless, integral first facesheet and the seamless, integral second facesheet.

17. The apparatus of claim 12, wherein the selected seamless first cell-chamber volume differs from the selected seamless second cell-chamber volume.

18. The apparatus of claim 12, wherein the selected seamless first cell-wall thickness differs from the selected seamless second cell-wall thickness.

19. The apparatus of claim 12, wherein the selected first cell-wall density is substantially equivalent to the selected second cell-wall density.

20. The apparatus of claim 12, wherein the selected first cell-wall density differs from the selected second cell-wall density.

21. An object comprising the apparatus of claim 12.

22. An aircraft-engine assembly comprising the apparatus of claim 12.

23. An aircraft comprising the apparatus of claim 12.

24. The apparatus of claim 1, wherein said internal cell chamber contour geometry is an irregular internal cell chamber contour geometry.

25. A method for attenuating sound in an aircraft assembly, the method comprising:

providing an aircraft assembly;

integrating into the aircraft assembly a seamless, unitary acoustic panel, said seamless, unitary acoustic panel comprising:

a seamless, integral first facesheet;

a seamless, integral second facesheet, at least one of said seamless, integral first facesheet and said seamless, integral second facesheet comprising a plurality of perforations extending through said at least one of said seamless, integral first facesheet and said seamless, integral second facesheet;

a seamless, integral cellular-core section seamlessly interposed between said seamless, integral first facesheet and said seamless, integral second facesheet, said seamless, integral cellular-core section comprising a plurality of seamless cells, said plurality of seamless cells comprising a plurality of seamless cell walls, each of said plurality of seamless cell walls comprising a cell wall length, said plurality of seamless cell walls defining a seamless cell chamber in each of said plurality of seamless cells, said seamless cell chamber comprising a selected chamber contour, said selected chamber contour comprising a curving irregular geometry, said seamless cell chamber comprising a selected and tailored seamless cell-chamber volume;

wherein said seamless cell chamber comprises a selected internal cell chamber contour, said internal cell chamber contour comprising an internal cell chamber contour geometry, said internal cell chamber contour geometry configured to form a selected internal cell chamber contour curved bend, said internal cell chamber contour curved bend oriented to change direction toward and away from a cell-wall section more than once within and along an at least one seamless cell chamber length;

wherein at least one of the plurality of seamless cells further comprises differing cell properties from at least one of a remainder of the plurality of seamless cells, said differing cell properties comprising at least one of differing cell-wall volume, differing cell-wall thickness, differing cell-wall density, and differing cell sound-attenuation ranges;

wherein the at least one of the plurality of cell walls is manufactured in real time to form a varying cell wall thickness along the length of more than one of the plurality of seamless cell walls; and wherein the plurality of seamless cell walls defining the seamless cell chamber further comprise a non-linear orientation of an entire seamless cell chamber along the entirety of the at least one seamless cell chamber length.

26. The method of claim 25, wherein at least one of said plurality of seamless cells comprises a seamless septum, said seamless septum positioned seamlessly within the at least one of said plurality of seamless cells, said seamless septum positioned seamlessly at a selected depth within the at least one of said plurality of seamless cells.

27. The method of claim 25, wherein the aircraft assembly is at least one of an aircraft-engine assembly, an aircraft-fuselage assembly, and an aircraft assembly in communication with an airflow.

28. The method of claim 25, wherein said internal cell chamber contour geometry is an irregular internal cell chamber contour geometry.

29. A method for making a seamless unitary acoustic panel, the method comprising:

directing a selected amount of a tailorable first feedstock material to a material-deposition machine to form a first facesheet material;

depositing a selected amount of the tailorable first facesheet material from the material-deposition machine to a base to form a seamless, integral first facesheet;

directing a selected amount of a tailorable second feedstock material to a material-deposition machine to form a seamless, integral cellular-core material, depositing a selected amount of the seamless, integral cellular-core material from the material-deposition machine to the seamless, integral first facesheet to form a seamless, integral cellular-core section incorporated into the seamless, integral first facesheet, said selected amount of the seamless, integral cellular-core material deposited to form a plurality of seamless cell walls comprising a seamless cell length, said plurality of seamless cell walls manufactured in real time to form a varying cell wall thickness along the length of the more than one of the plurality of seamless cell walls, said plurality of seamless cell walls defining a seamless cell chamber in each of said plurality of seamless cells, said seamless cell chamber comprising a selected chamber contour, said selected chamber contour comprising a curving irregular geometry, said seamless cell chamber comprising a selected and tailored seamless cell-chamber volume;

directing a selected amount of a tailorable third feedstock material to a material-deposition machine to form a second facesheet material;

depositing a selected amount of said second facesheet material from the material-deposition machine to the seamless, integral cellular-core section to form a seamless, integral second facesheet incorporated into the seamless, integral cellular-core section;

wherein said second facesheet material is deposited onto the seamless, integral cellular-core section to form a plurality of perforations in the seamless, integral second facesheet, said plurality of perforations formed the seamless, integral second facesheet during deposition of the second facesheet material; and wherein the seamless, integral first facesheet, the seamless, integral cellular-core section, and the seamless, integral second facesheet form the seamless, unitary acoustic panel;

wherein said seamless cell chamber comprises a selected internal cell chamber contour, said internal cell chamber contour comprising an internal cell chamber contour geometry, said internal cell chamber contour geometry configured to form a selected internal cell chamber contour curved bend, said internal cell chamber contour curved bend oriented to change direction toward and away from a cell-wall section more than once within and along an at least one seamless cell chamber length; and wherein the plurality of seamless cell walls defining the seamless cell chamber further comprise a non-linear orientation of an entire seamless cell chamber along the entirety of the at least one seamless cell chamber length.

30. The method of claim 29, wherein at least one of the tailorable first feedstock material and the tailorable third feedstock material comprise a metal.

31. The method of claim 29, wherein the tailorable second feedstock material comprises a metal, said tailorable second feedstock material different from the tailorable first feedstock material, said tailorable second feedstock material different from the tailorable third feedstock material.

32. The method of claim 29, wherein the material-deposition machine is a large-area 3-D printer.

33. A seamless, unitary acoustic panel made according to the method of claim 29, said seamless, unitary acoustic panel comprising:

a seamless, integral first facesheet;

a seamless, integral second facesheet, at least one of said seamless, integral first facesheet and said seamless, integral second facesheet comprising a plurality of perforations extending through said at least one of said seamless, integral first facesheet and said seamless, integral second facesheet; and a seamless, integral cellular-core section seamlessly interposed between said seamless, integral first facesheet and said seamless, integral second facesheet, said seamless, integral cellular-core section comprising a plurality of seamless cells, said seamless cells comprising the seamless cell walls.

34. The seamless, unitary acoustic panel of claim 33, wherein at least one of the plurality of seamless cells further comprises differing cell properties from at least one of a remainder of the plurality of seamless cells, said differing cell properties comprising at least one of differing cell-wall volume, differing cell-wall thickness, differing cell-wall density, and differing cell sound-attenuation ranges.

35. The seamless, unitary acoustic panel of claim 33, wherein said seamless, integral cellular-core section comprises:

a seamless first cellular-core region, said seamless first cellular-core region comprising a plurality of seamless first cells, each of the plurality of seamless first cells comprising a plurality of seamless first cell walls; and a seamless second cellular-core region, said seamless second cellular-core region positioned adjacent the seamless first cellular-core region, said seamless second cellular-core region comprising a plurality of seamless second cells, each of the plurality of seamless second cells comprising a plurality of seamless second cell walls.

36. The seamless, unitary acoustic panel of claim 35, wherein at least a portion of at least one of said plurality of seamless first cells in the seamless first cellular-core region comprises at least one of the plurality of seamless first cell walls oriented non-perpendicular to at least one of the seamless, integral first facesheet and the seamless, integral second facesheet.

37. The seamless, unitary acoustic panel of claim 35, wherein at least a portion of the at least one of said plurality of seamless second cells in the seamless second cellular-core region comprises at least one of the plurality of seamless second cell walls oriented non-perpendicular to at least one of the seamless, integral first facesheet, and the seamless, integral second facesheet.

38. The seamless, unitary acoustic panel of claim 35, wherein the at least one of the plurality of seamless first cells further comprises differing cell properties from the at least one of the plurality of seamless second cells, said differing cell properties comprising at least one of differing cell-wall volume, differing cell-wall thickness, differing cell-wall density, and differing cell sound-attenuation ranges.

39. An aircraft assembly comprising the seamless, unitary acoustic panel made according to the method of claim 29.

40. An aircraft comprising the seamless, unitary acoustic panel made according to the method of claim 29.

41. A method for making a seamless, unitary cellular-core structure, the method comprising:

directing a selected amount of a tailorable first feedstock material to a material-deposition machine to form a first cellular-core material, said seamless, unitary first cellular-core material comprising a first density;

depositing a selected amount of the first cellular-core material from the material-deposition machine;

forming a seamless, unitary cellular-core structure, said seamless, unitary cellular-core structure comprising a plurality of seamless cells, said plurality of seamless cells comprising a plurality of seamless cell walls, said plurality of seamless cells further comprising a seamless cell chamber;

wherein said seamless cell chamber comprises a selected internal cell chamber contour, said internal cell chamber contour comprising an internal cell chamber contour geometry, said internal cell chamber contour geometry configured to form a selected internal cell chamber contour curved bend, said internal cell chamber contour curved bend oriented to change direction toward and away from a cell-wall section more than once within and along an at least one seamless cell chamber length; and wherein the plurality of seamless cell walls defining the seamless cell chamber further comprise a non-linear orientation of an entire seamless cell chamber along the entirety of the at least one seamless cell chamber length.

42. The method of claim 41, further comprising:

doping, in real time, the selected amount of the tailorable first feedstock material with a second feedstock material to change a characteristic of the tailorable first feedstock material and to form a second cellular-core material, said second cellular-core material comprising a second density, said second density differing from the first density;

depositing a selected amount of the seamless, unitary second cellular-core material from the material-deposition machine;

forming at least a portion of the seamless, unitary cellular-core structure, said seamless, unitary cellular-core structure comprising a plurality of seamless cells, said plurality of seamless cells comprising a plurality of seamless cell walls;

wherein at least one of said plurality of seamless cell walls comprises the first density; and wherein at least one of said plurality of seamless cell walls comprises a second density.

43. The method of claim 42, wherein at least one of the plurality of seamless cells further comprises differing cell properties from at least one of a remainder of the plurality of seamless cells, said differing cell properties comprising at least one of differing cell-wall volume, differing cell-wall thickness, differing cell-wall density, and differing cell sound-attenuation ranges.

44. The method of claim 43, wherein the material-deposition machine is a large-area 3-D printer.

45. A seamless, unitary cellular-core structure made according to the method of claim 44.

46. A seamless, unitary cellular-core acoustic panel made according to the method of claim 44.

47. An aircraft comprising the seamless, unitary cellular-core structure made according to the method of claim 44.

48. An aircraft assembly comprising the seamless, unitary cellular-core structure made according to the method of claim 44.

49. The method of claim 41, wherein the material-deposition machine is a large-area 3-D printer.

50. A seamless, unitary cellular-core structure made according to the method of claim 49.

51. A seamless, unitary cellular-core acoustic panel made according to the method of claim 49.

52. A seamless unitary cellular-core structure made according to the method of claim 49, wherein the seamless, unitary cellular-core structure comprises at least one of aluminum, aluminum alloy, titanium, titanium alloy, steel alloy, and combinations thereof.

53. A seamless unitary cellular-core acoustic panel made according to the method of claim 49, wherein the seamless, unitary cellular-core acoustic panel comprises at least one of aluminum, aluminum alloy, titanium, titanium alloy, steel alloy, and combinations thereof.

54. An aircraft comprising the seamless, unitary cellular-core structure made according to the method of claim 49.

55. An aircraft assembly comprising the seamless, unitary cellular-core structure made according to the method of claim 49.

* * * * *